US011168783B1

(12) United States Patent
Cradit et al.

(10) Patent No.: US 11,168,783 B1
(45) Date of Patent: Nov. 9, 2021

(54) AXLE ASSEMBLY HAVING A TRANSMISSION MODULE

(71) Applicant: ArvinMeritor Technology, LLC, Troy, MI (US)

(72) Inventors: Jeremy Cradit, Troy, MI (US); David Zueski, Troy, MI (US); Supreeth Chandrashekar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/178,502

(22) Filed: Feb. 18, 2021

(51) Int. Cl.
*F16H 57/04* (2010.01)
*F16H 57/021* (2012.01)
*B60K 1/00* (2006.01)
*B60K 17/16* (2006.01)
*F16H 37/08* (2006.01)
*F16H 57/037* (2012.01)
*F16H 57/02* (2012.01)

(52) U.S. Cl.
CPC .......... *F16H 57/0476* (2013.01); *B60K 1/00* (2013.01); *B60K 17/165* (2013.01); *F16H 37/0813* (2013.01); *F16H 57/021* (2013.01); *F16H 57/037* (2013.01); *F16H 57/045* (2013.01); *F16H 57/0423* (2013.01); *F16H 57/0424* (2013.01); *F16H 57/0457* (2013.01); *F16H 57/0471* (2013.01); *F16H 57/0483* (2013.01); *B60K 2001/001* (2013.01); *F16H 2057/02034* (2013.01); *F16H 2057/02052* (2013.01); *F16H 2702/04* (2013.01)

(58) Field of Classification Search
None
See application file for complete search history.

(56) References Cited

U.S. PATENT DOCUMENTS

| 1,981,236 | A | 11/1934 | Logue | |
|---|---|---|---|---|
| 2,602,712 | A * | 7/1952 | Johnston | F16N 7/12 384/415 |
| 6,176,146 | B1 | 1/2001 | Ore | |
| 7,312,449 | B2 * | 12/2007 | Nakasuji | G01N 23/04 250/311 |
| 7,798,937 | B2 | 9/2010 | Gitt | |
| 2009/0247348 | A1 * | 10/2009 | Haupt | F16H 57/0479 475/159 |
| 2011/0111910 | A1 | 5/2011 | Ideshio et al. | |
| 2014/0311266 | A1 | 10/2014 | Nakashima et al. | |
| 2017/0059007 | A1 | 3/2017 | Eo et al. | |
| 2018/0015816 | A1 | 1/2018 | Robinette et al. | |
| 2018/0112770 | A1 | 4/2018 | Hansson et al. | |
| 2019/0054816 | A1 | 2/2019 | Garcia et al. | |
| 2019/0054817 | A1 | 2/2019 | Garcia et al. | |

(Continued)

OTHER PUBLICATIONS

U.S. Appl. No. 16/594,362, filed Oct. 7, 2019; 31 Pages.

(Continued)

*Primary Examiner* — Colby M Hansen
(74) *Attorney, Agent, or Firm* — Brooks Kushman PC

(57) ABSTRACT

An axle assembly having a housing assembly, an electric motor module, and a transmission module. A first lubricant passage may route lubricant from the housing assembly to the transmission housing cavity of the transmission module. The first lubricant passage may extend through a motor housing, a motor cover, and a first transmission housing.

20 Claims, 14 Drawing Sheets

(56) References Cited

U.S. PATENT DOCUMENTS

| | | |
|---|---|---|
| 2019/0054818 A1 | 2/2019 | Garcia et al. |
| 2020/0173494 A1 | 6/2020 | Smith et al. |
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |

OTHER PUBLICATIONS

U.S. Appl. No. 16/594,702, filed Oct. 7, 2019; 32 Pages.
U.S. Appl. No. 16/594,932, filed Oct. 7, 2019; 33 Pages.
U.S. Appl. No. 16/594,875, filed Oct. 7, 2019; 49 Pages.

* cited by examiner

AXLE ASSEMBLY HAVING A TRANSMISSION MODULE

TECHNICAL FIELD

This disclosure relates to an axle assembly having a transmission module and lubricant distribution associated with the transmission module.

BACKGROUND

An axle assembly having an electric motor module is disclosed in U.S. Patent Publication No. 2019/0054816.

SUMMARY

In at least one embodiment an axle assembly is provided. The axle assembly may include a housing assembly, an electric motor module, and a transmission module. The housing assembly may receive a differential assembly and may at least partially define a cavity that has a sump portion that receives lubricant. The electric motor module may include a motor housing and a motor cover. The motor housing may be mounted to the housing assembly and may at least partially define a motor housing cavity inside which an electric motor is received. The motor cover may be mounted to an end of the motor housing that is disposed opposite the housing assembly. The transmission module may include a first transmission housing and a second transmission housing. The first transmission housing may be mounted to the motor cover. The second transmission housing may be mounted to the first transmission housing. The first and second transmission housings may cooperate to define a transmission housing cavity that receives a transmission that may be operatively connected to the electric motor. A first lubricant passage may route lubricant from the housing assembly to the transmission housing cavity. The first lubricant passage may extend through the motor housing, the motor cover, and the first transmission housing, and may be separated from the motor housing cavity.

In at least one embodiment an axle assembly is provided. The axle assembly may include a housing assembly, an electric motor module, and a transmission module. The housing assembly may receive a differential assembly and may at least partially define a cavity that has a sump portion that may receive lubricant. The electric motor module may be mounted to the housing assembly. The transmission module may include a first transmission housing and a second transmission housing. The first transmission housing may be mounted to the electric motor module and may be fluidly connected to the housing assembly via a first lubricant passage. The second transmission housing may be mounted to the first transmission housing. The first and second transmission housings may cooperate to define a transmission housing cavity that may receive a transmission. A lubricant catcher may be received in the transmission housing cavity. The lubricant catcher may be mounted to the second transmission housing and may extend from the second transmission housing toward the first transmission housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
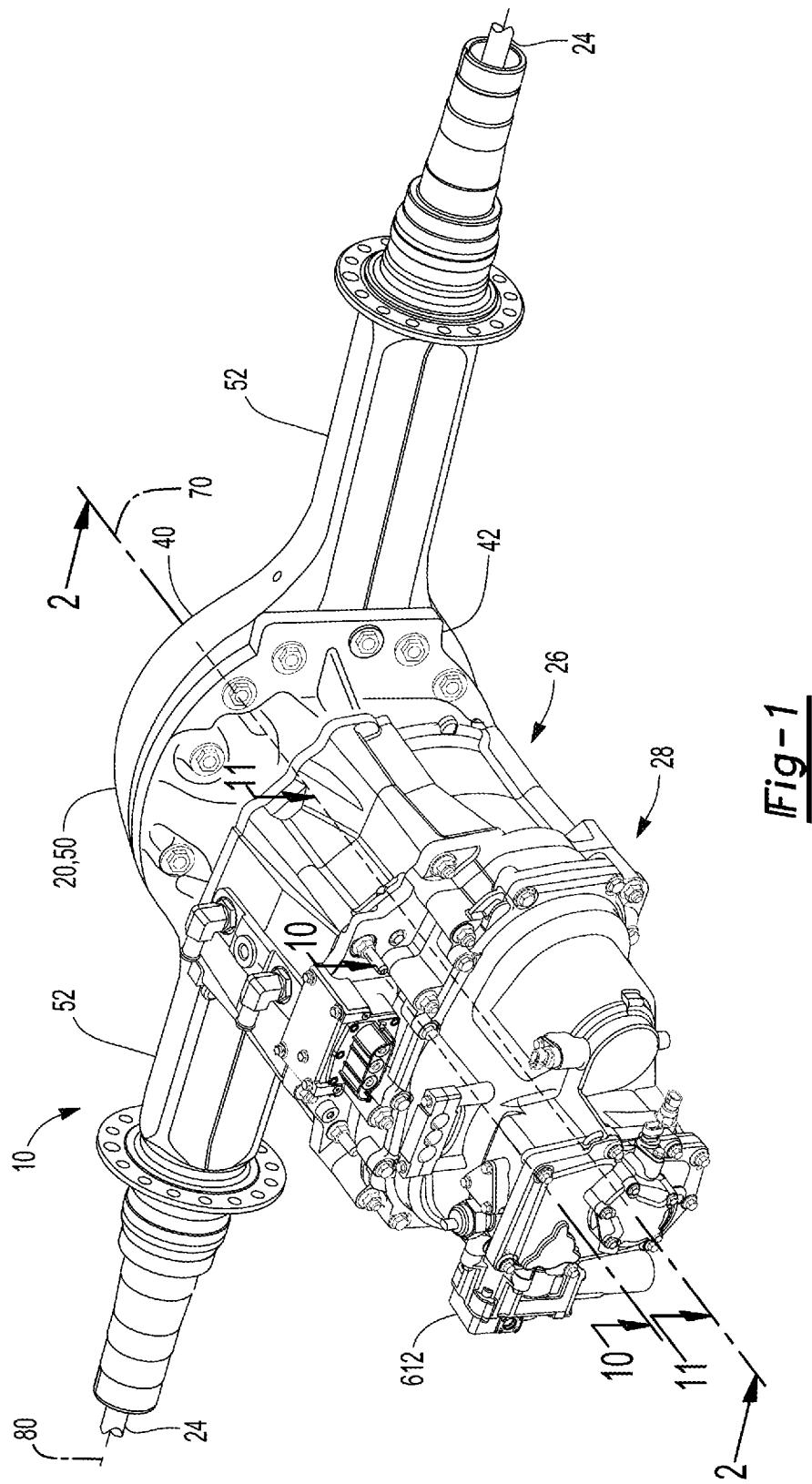
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 12:
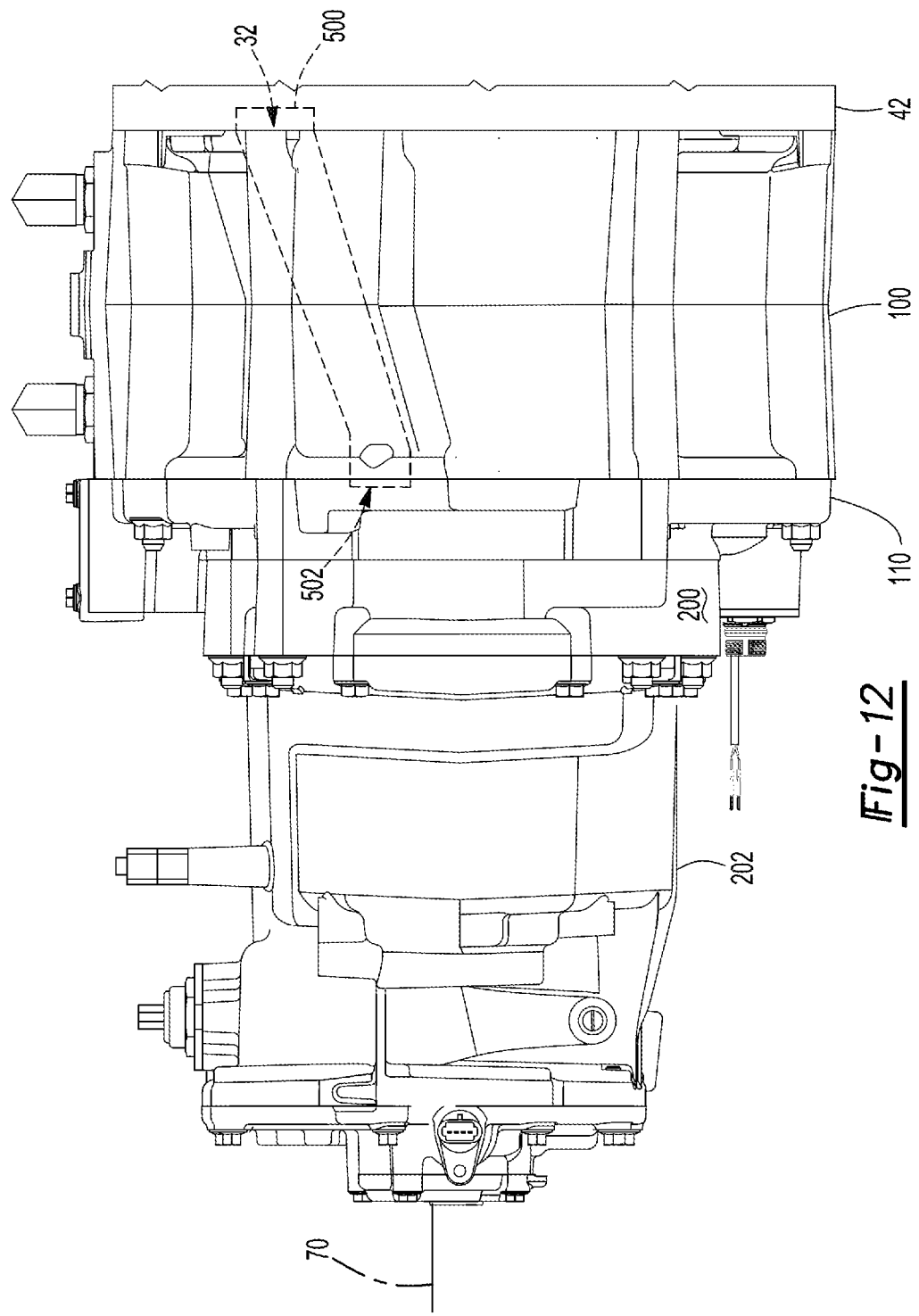
FIG. 12 is a side view of a portion of the axle assembly showing the first lubricant passage.
Figure 13:
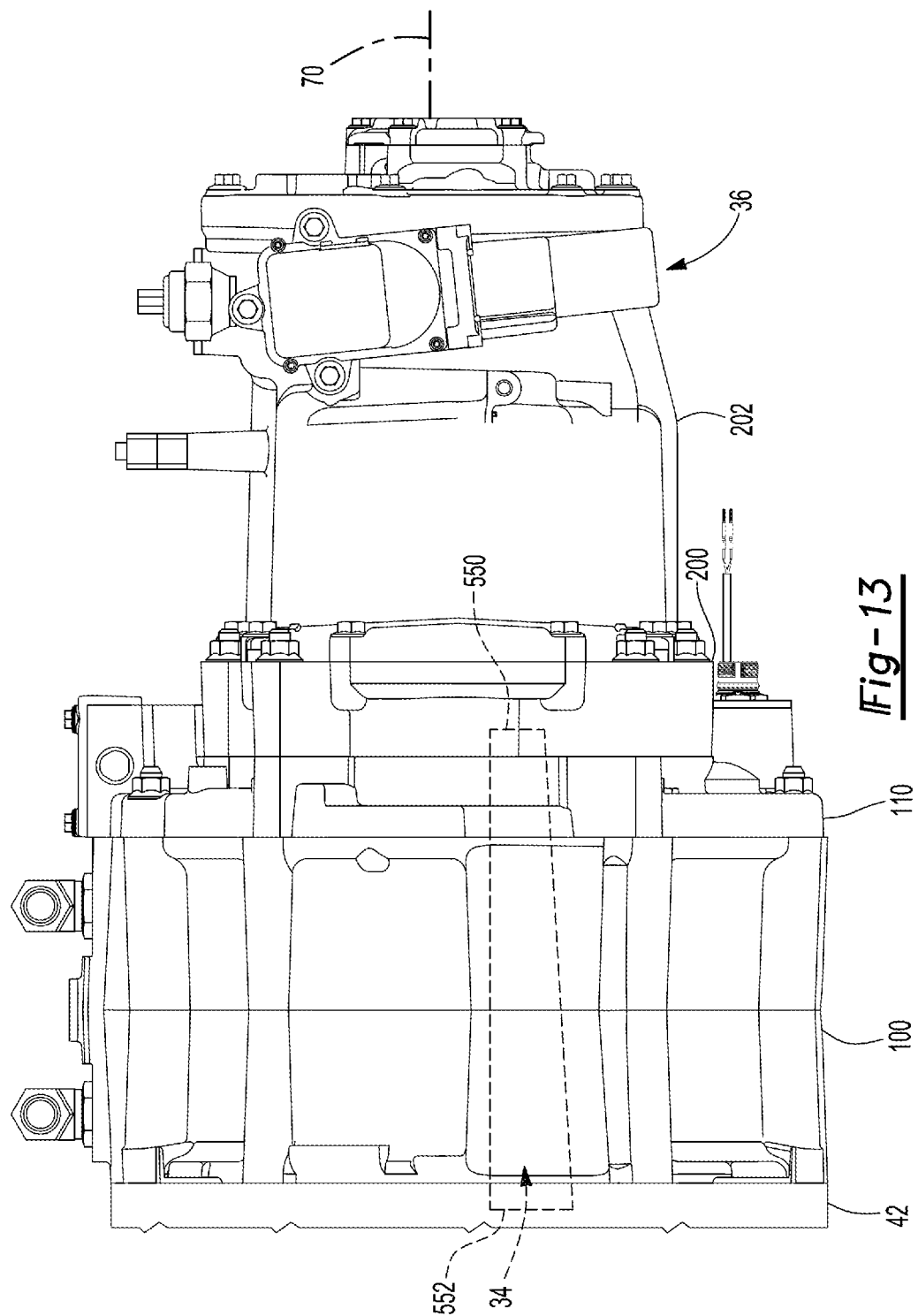
FIG. 13 is an opposite side view of the portion of the axle assembly shown in FIG. 12 showing a second lubricant passage.

One or more axle assemblies may be provided with the vehicle. As is best shown with reference to FIGS. 1 and 2, the axle assembly 10 may include a housing assembly 20, a differential assembly 22, at least one axle shaft 24, an electric motor module 26, and a transmission module 28, and a drive pinion 30. As is best shown in FIGS. 12 and 13, the axle assembly 10 may include a first lubricant passage 32, a second lubricant passage 34, a shift mechanism 36, or combinations thereof.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

Figure 2:
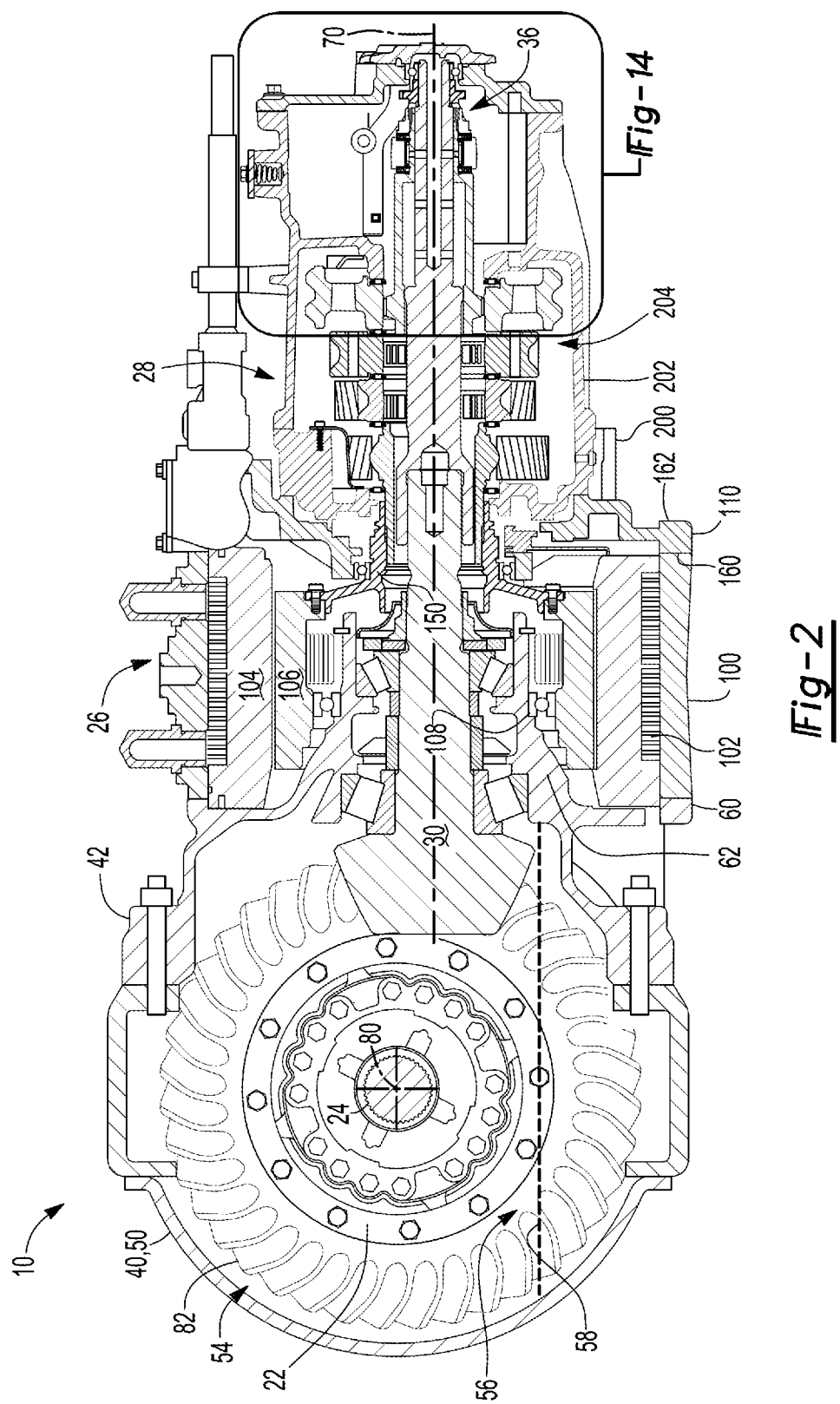
FIG. 2 is a section view of the axle assembly along section line 2-2.

The center portion 50 may be disposed proximate the center of the axle housing 40. As is best shown in FIG. 2, the center portion 50 may define a cavity 54 that may at least partially receive the differential assembly 22. A lower region of the center portion 50 may at least partially define a sump portion 56 that may contain or collect lubricant 58. Lubricant 58 in the sump portion 56 may be splashed by a ring gear 82 of the differential assembly 22 and distributed to lubricate various components that may or may not be received in the housing assembly 20. For instance, some splashed lubricant 58 may lubricate components that are received in the cavity 54 like the differential assembly 22, bearing assemblies that rotatably support the differential assembly 22, a drive pinion 30, and so on, while some splashed lubricant 58 may be routed out of the cavity 54 via the first lubricant passage 32, which is best shown in FIG. 12, to lubricate components located outside of the housing assembly 20, such as components associated with the transmission module 28, the shift mechanism 36, or both as will be discussed in more detail below.

Referring to FIGS. 1 and 2, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

The differential carrier 42 may be mounted to the center portion 50 of the axle housing 40. The differential carrier 42 may support the differential assembly 22 and may facilitate mounting of the electric motor module 26. For example, the differential carrier 42 may include one or more bearing supports that may support a bearing like a roller bearing assembly that may rotatably support the differential assembly 22. In at least one configuration, the differential carrier 42 may include a mounting flange 60 and/or a bearing support wall 62.

Referring to FIG. 2, the mounting flange 60 may facilitate mounting of the electric motor module 26. As an example, the mounting flange 60 may be configured as a ring that may extend outward and away from an axis 70 and may extend around the axis 70. In at least one configuration, the mounting flange 60 may include a set of fastener holes that may be configured to receive fasteners, such as a bolt or stud, that may secure the electric motor module 26 to the mounting flange 60.

The bearing support wall 62 may support bearings that may rotatably support other components of the axle assembly 10. For example, the bearing support wall 62 may support a bearing that may rotatably support the drive pinion 30, a bearing that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 30 and the bearings that rotatably support the drive pinion 30. The bearing support wall 62 may be integrally formed with the differential carrier 42 or may be a separate component that is secured or fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of the drive pinion 30. Accordingly, the differential assembly 22 may receive torque from the drive pinion 30 via the ring gear 82 and transmit torque to the axle shafts 24.

The drive pinion 30 may operatively connect the transmission module 28 to the differential assembly 22. As such, the drive pinion 30 may transmit torque between the differential assembly 22 and the transmission module 28. In at least one configuration, the drive pinion 30 may be rotatable about the axis 70 and may be rotatably supported inside another component, such as the bearing support wall 62.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the transmission module 28 and the drive pinion 30 as will be discussed in more detail below. The electric motor module 26 may be primarily disposed outside the differential carrier 42. In addition, the electric motor module 26 may be axially positioned between the axle housing 40 and the transmission module 28. In at least one configuration, the electric motor module 26 may include a motor housing 100, a coolant jacket 102, a stator 104, a rotor 106, at least one rotor bearing assembly 108, and a motor cover 110.

Figure 4:
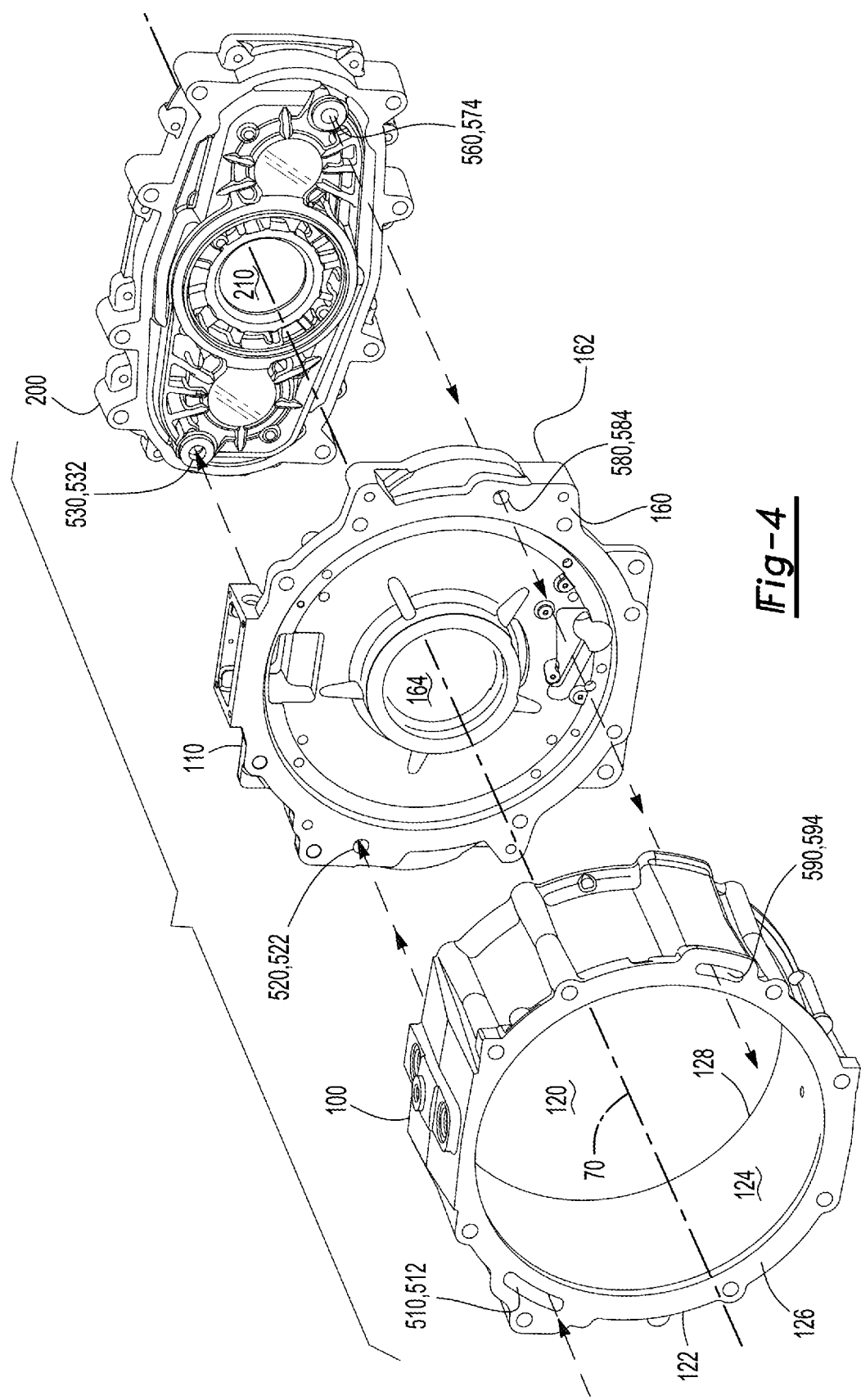
FIGS. 4 and 5 are exploded views that show a motor housing, a motor cover, and a first transmission housing of the axle assembly.
Figure 5:
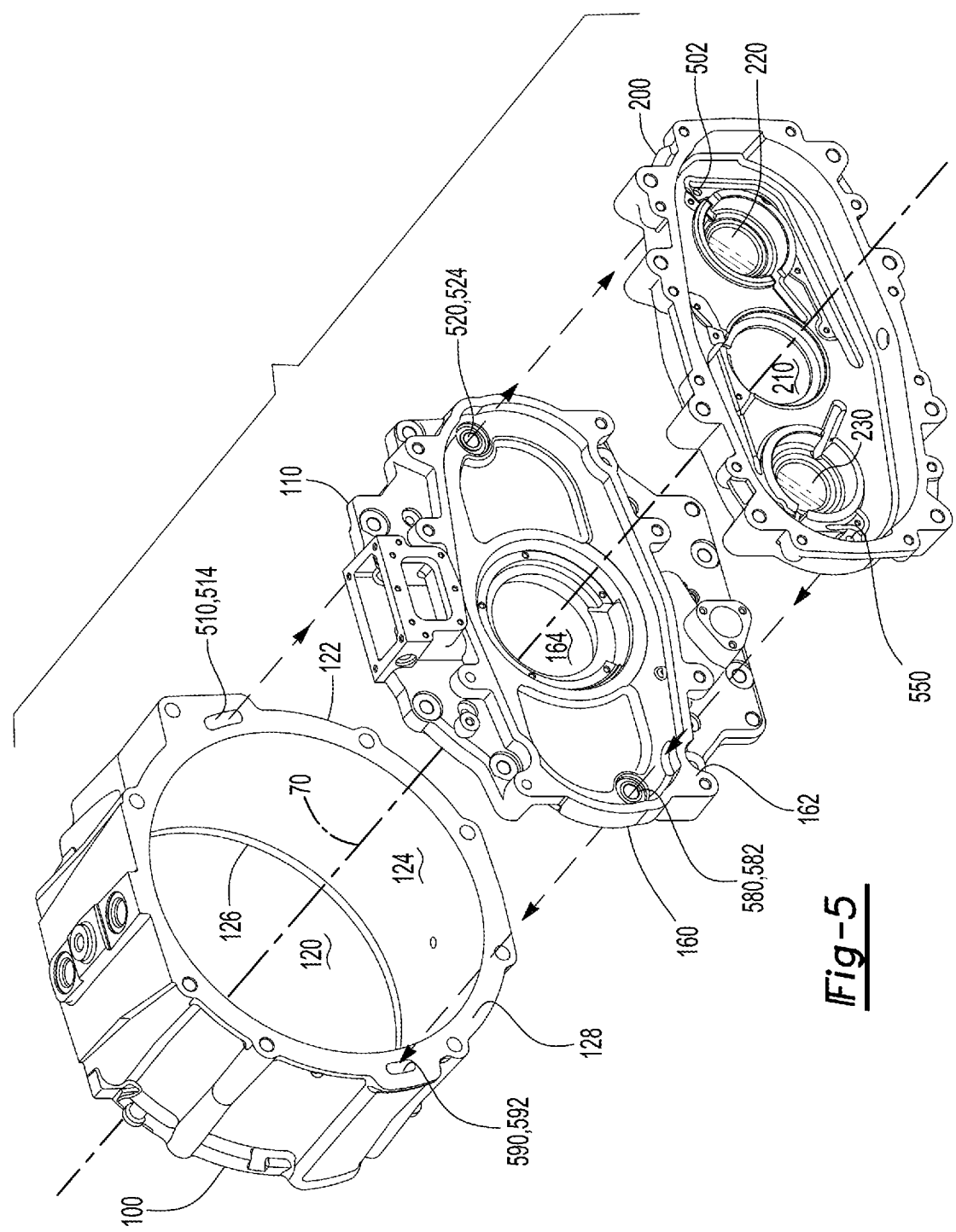

Referring to FIGS. 2, 4 and 5, the motor housing 100 may extend between the differential carrier 42 and the motor cover 110. The motor housing 100 may be mounted to the differential carrier 42 and the motor cover 110. For example, the motor housing 100 may extend from the mounting flange 60 of the differential carrier 42 to the motor cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, and a second end surface 128.

The exterior side 122 may face away from the axis 70 and may define an exterior or outside surface of the motor housing 100.

The interior side 124 may be disposed opposite the exterior side 122 and may face toward the axis 70. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42 and may engage or contact the mounting flange 60.

The second end surface 128 may be disposed opposite the first end surface 126. As such, the second end surface 128 may be disposed at an end of the motor housing 100 that may face toward the motor cover 110 and may engage or contact the motor cover 110.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially (e.g., in a direction along the axis 70) between the differential carrier 42 and the motor cover 110. For example, the coolant jacket 102 may extend axially from the differential carrier 42 to the motor cover 110. In addition, the coolant jacket 102 may extend around the axis 70 and around the stator 104. Accordingly, the stator 104 may be at least partially received in and may be encircled by the coolant jacket 102. The coolant jacket 102 may extend in a radial direction from the stator 104 to the interior side 124 of the motor housing 100. In at least one configuration, the coolant jacket 102 may include a plurality of channels through which coolant may flow.

The stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. In addition, the rotor 106 may extend around and may be supported by the bearing support wall 62. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current or may be induction-based.

One or more rotor bearing assemblies 108 may rotatably support the rotor 106. For example, a rotor bearing assembly 108 may extend around and receive the bearing support wall 62 of the differential carrier 42 and may be received inside of the rotor 106. The rotor 106 may be operatively connected to the drive pinion 30. For instance, a coupling such as a rotor output flange 150 may operatively connect the rotor 106 to the transmission module 28, which in turn may be operatively connectable to the drive pinion 30.

Referring to FIGS. 2, 4 and 5, the motor cover 110 may be mounted to the motor housing 100 and may be disposed opposite the axle housing 40 and the differential carrier 42. For example, the motor cover 110 may be mounted to the second end surface 128 of the motor housing 100. The motor cover 110 may be spaced apart from and may not engage the differential carrier 42. The motor cover 110 may be provided in various configurations. In at least one configuration, the motor cover 110 may include a first side 160 and a second side 162. The first side 160 may face toward and may engage the motor housing 100. The second side 162 may be disposed opposite the first side 160. The second side 162 may face away from the motor housing 100. The motor cover 110 may also include a motor cover opening 164 through which the drive pinion 30 may extend.

Transmission Module

Figure 10:
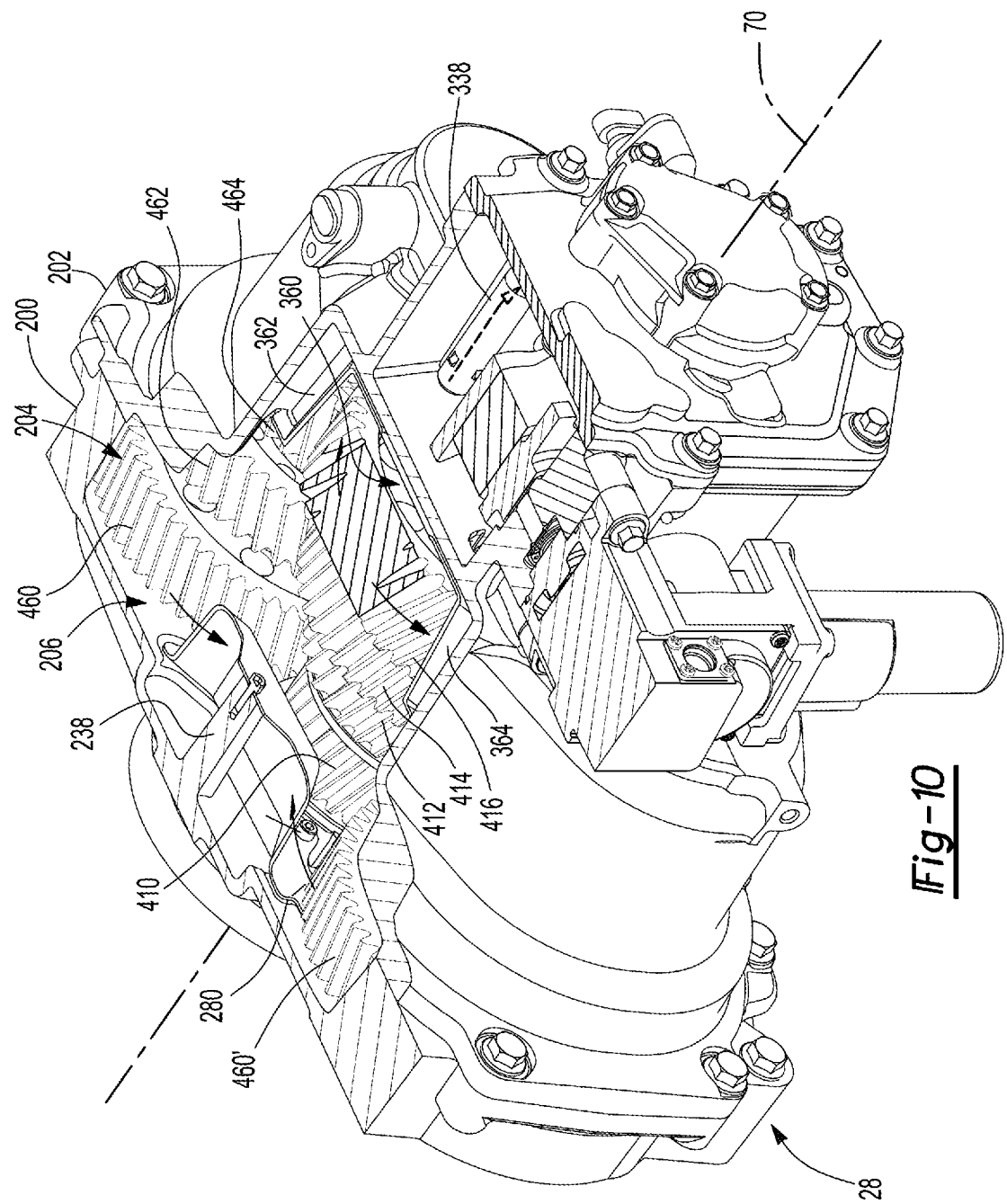
FIG. 10 is a top section view of a portion of the axle assembly along section line 10-10.
Figure 11:
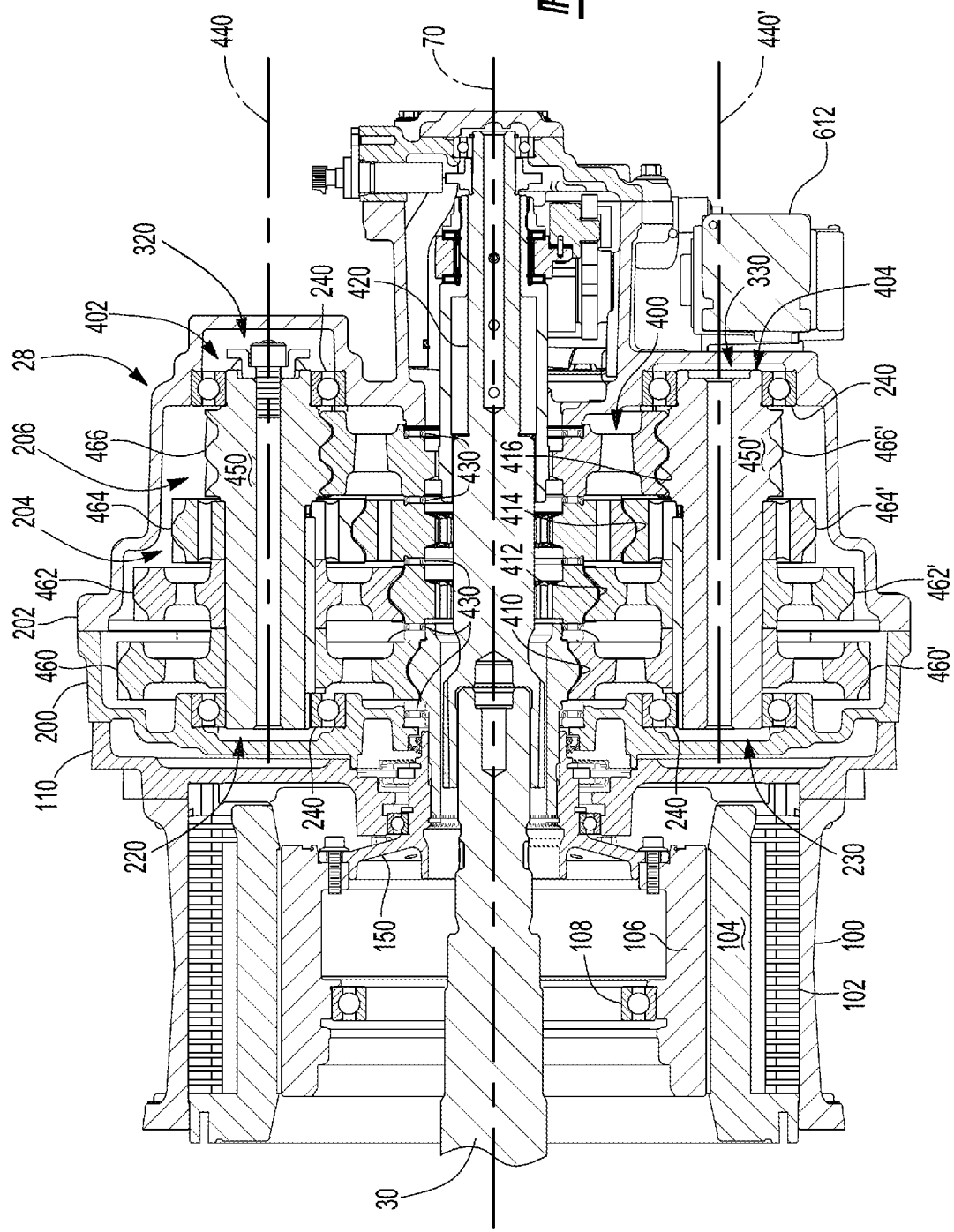
FIG. 11 is a top section view of the axle assembly along section line 11-11 with the differential carrier omitted for clarity.

Referring primarily to FIGS. 2, 10 and 11, the transmission module 28 may transmit torque between the electric motor module 26 and the differential assembly 22. As such, the transmission module 28 may be operatively connectable to the electric motor module 26 and the differential assembly 22. In at least one configuration, the transmission module 28 may include a first transmission housing 200, a second transmission housing 202, and a transmission 204. The first transmission housing 200 and the second transmission housing 202 may cooperate to define a transmission housing cavity 206 that may receive the transmission 204.

Figure 6:
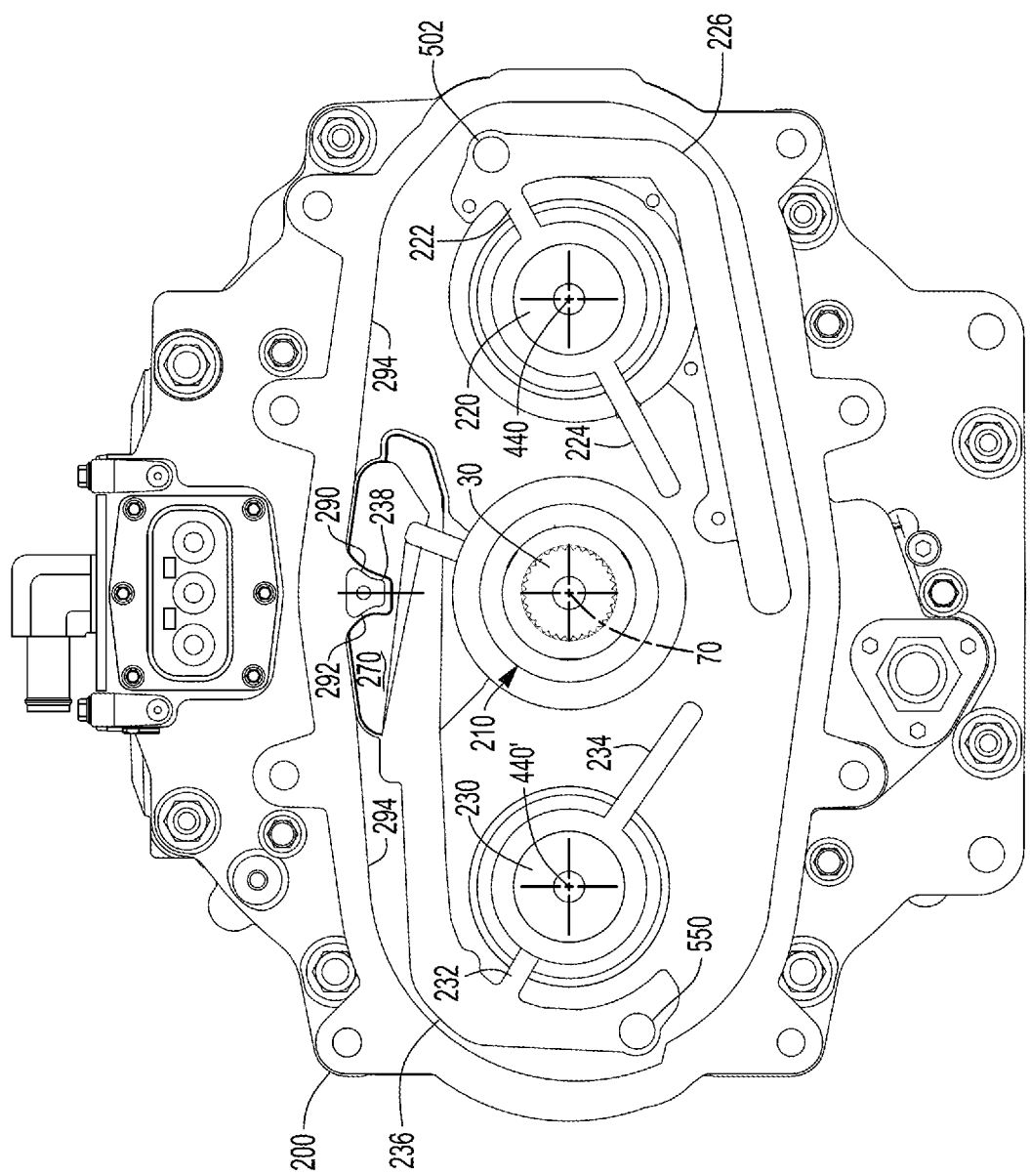
FIG. 6 is a side view of the portion of the axle assembly that includes the first transmission housing.
Figure 7:
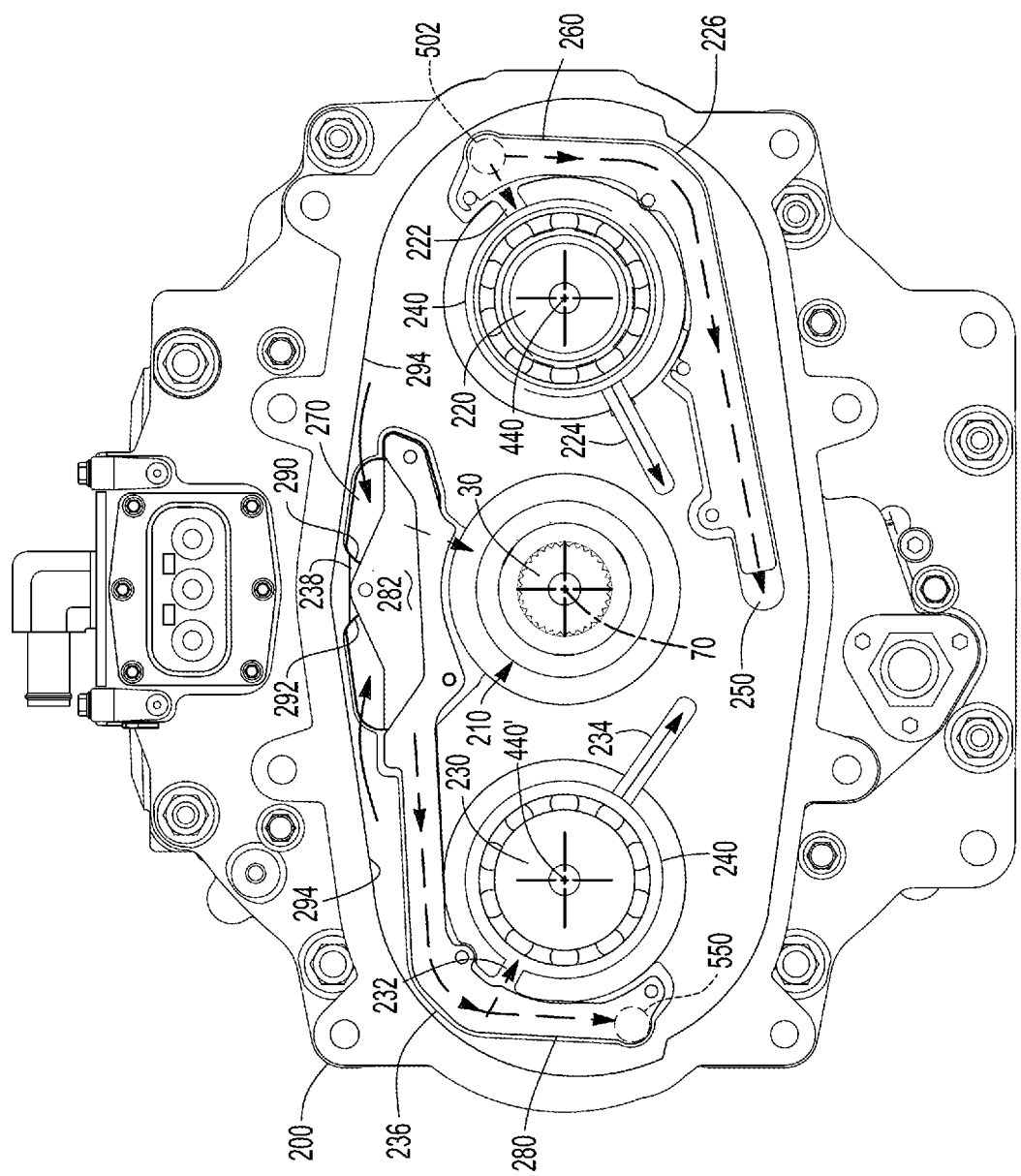
FIG. 7 is a side view of the portion of the axle assembly shown in FIG. 6 with baffles and bearing assemblies installed on the first transmission housing.

Referring primarily to FIGS. 2 and 4-7, the first transmission housing 200 may be mounted to the electric motor module 26. For instance, the first transmission housing 200 may be mounted to the second side 162 of the motor cover 110. As such, the motor cover 110 may separate the first transmission housing 200 from the motor housing 100. In at least one configuration and as is best shown in FIG. 5, the first transmission housing 200 may define a center hole 210, an outlet 502 of the first lubricant passage 32, and an inlet 550 of the second lubricant passage 34. As is best shown with reference to FIG. 6, the first transmission housing 200 may include first pocket 220, a first connection passage 222, a first outlet passage 224, a first channel 226, a second pocket 230, a second connection passage 232, a second outlet passage 234, a second channel 236, a deflector 238, or combinations thereof. It is noted that the arrowed lines in FIG. 7 represent the flow of lubricant 58 that may be associated with these features.

Referring primarily to FIG. 5-7, the center hole 210 may be a through hole that may extend around the axis 70 or along the axis 70. In at least one configuration, the center hole 210 may receive the drive pinion 30.

The first pocket 220 may be configured as a recess or indentation in the first transmission housing 200 that may extend toward the motor cover 110 and away from the second transmission housing 202. As is best shown in FIG. 7, the first pocket 220 may receive a bearing assembly 240 that may rotatably support a first countershaft of the transmission 204. The first pocket 220 may have a generally circular or cylindrical configuration and may be spaced apart from the center hole 210. As is best shown in FIG. 6, the first pocket 220 or a portion thereof may be positioned below the outlet 502. In addition, the first pocket 220 may be laterally positioned closer to the center hole 210 than the outlet 502 is positioned to the center hole 210.

The first connection passage 222 may extend from the outlet 502 of the first lubricant passage 32 to the first pocket 220. As such, the first connection passage 222 may route lubricant from the outlet 502 to the first pocket 220 and to the bearing assembly 240 that is received in the first pocket 220. The first connection passage 222 may be configured as a recess or indentation in the first transmission housing 200. The first connection passage 222 may extend downward toward the first pocket 220 to facilitate the flow of lubricant 58 under the force of gravity from the outlet 502 to the first pocket 220. The first connection passage 222 may be linear in one or more embodiments.

The first outlet passage 224 may extend from the first pocket 220 in a direction that may extend away from the outlet 502, the first connection passage 222, or both. The first outlet passage 224 may be configured as a recess or indentation in the first transmission housing 200. The first outlet passage 224 may extend downward from the first pocket 220 to facilitate the flow of lubricant under the force of gravity from the first pocket 220 into the transmission housing cavity 206. The first connection passage 222 and the first outlet passage 224 may extend from opposite sides of the first pocket 220.

The first channel 226 may route some lubricant 58 that exits the outlet 502 partially around the first pocket 220. The first channel 226 may be configured as a recess or indentation in the first transmission housing 200 that may extend toward the motor cover 110 and away from the second transmission housing 202. In addition, the first channel 226 may be spaced apart from the first pocket 220 and may extend partially around the first pocket 220. For instance, the first channel 226 may extend from the outlet 502 of the first lubricant passage 32 to a first channel end 250. The first channel end 250 may be disposed below the first pocket 220 or closer to the bottom of the first transmission housing 200 than the first pocket 220. For instance, the first channel end 250 may be disposed underneath the axis 70, the center hole 210, or combinations thereof.

Referring to FIG. 7, a first baffle 260 may deflect lubricant 58 that exits the outlet 502 of the first lubricant passage 32 into the first channel 226. The first baffle 260 may have any suitable configuration. For instance, the first baffle 260 may be configured as a generally flat plate that may extend over the outlet 502 and over a portion of the first channel 226. The first baffle 260 may be fixedly disposed on the first transmission housing 200. For example, the first baffle 260 or a portion thereof may be received inside the first channel 226 and may be fastened to the first transmission housing 200 with one or more fasteners such as screws. The first baffle 260 may not cover the first channel end 250, thereby allowing lubricant 58 to exit the first channel 226 at the first channel end 250 and enter the transmission housing cavity 206.

Referring to FIGS. 6 and 7, the second pocket 230 may be configured as a recess or indentation in the first transmission housing 200 that may extend toward the motor cover 110 and away from the second transmission housing 202. The second pocket 230 may receive a bearing assembly 240 that may rotatably support a second countershaft of the transmission 204. The second pocket 230 may have a generally circular or cylindrical configuration and may be spaced apart from the center hole 210. The center hole 210 may be positioned between the first pocket 220 and the second pocket 230. The second pocket 230 or a portion thereof may be positioned above the inlet 550 of the second lubricant passage 34. In addition, the second pocket 230 may be laterally positioned closer to the center hole 210 than the inlet 550 is positioned to the center hole 210.

The second connection passage 232 may extend from the second channel 236 to the second pocket 230. As such, the second connection passage 232 may route lubricant 58 from the second channel 236 to the second pocket 230 and the bearing assembly 240 that is received in the second pocket 230. The second connection passage 232 may be configured as a recess or indentation in the first transmission housing 200. The second connection passage 232 may extend downward from the second channel 236 toward the second pocket 230 to facilitate the flow of lubricant 58 under the force of gravity from the second channel 236 to the second pocket 230. The second connection passage 232 may be linear in one or more embodiments.

The second outlet passage 234 may extend from the second pocket 230 in a direction that may extend away from the second connection passage 232. The second outlet passage 234 may be configured as a recess or indentation in the first transmission housing 200. The second outlet passage 234 may extend downward from the second pocket 230 to facilitate the flow of lubricant 58 under the force of gravity from the second pocket 230 into the transmission housing cavity 206. The second connection passage 232 and the second outlet passage 234 may extend from opposite sides of the second pocket 230.

The second channel 236 may route some lubricant 58 around the second pocket 230 to the inlet 550 of the second lubricant passage 34. The second channel 236 may be configured as a recess or indentation in the first transmission housing 200 that may extend toward the motor cover 110 and away from the second transmission housing 202. In addition, the second channel 236 may be spaced apart from the second pocket 230 and may extend partially around the second pocket 230. For instance, the second channel 236 may extend from an enlarged end portion 270 of the second channel 236 to the inlet 550 of the second lubricant passage 34. The enlarged end portion 270 may be located above the axis 70 and the center hole 210.

Referring to FIG. 7, a second baffle 280 may deflect or direct lubricant 58 from the second channel 236 into the inlet 550. The second baffle 280 may have any suitable configuration. For instance, a portion of the second baffle 280 may be configured as a generally flat plate that may extend over the inlet 550 and a portion of the second channel 236. The second baffle 280 may be fixedly disposed on the first transmission housing 200. For example, a portion of the second baffle 280 may be received inside the second channel 236 and may be fastened to the first transmission housing 200 with one or more fasteners such as screws. In at least one configuration, the second baffle 280 may include a scoop 282.

The scoop 282 may protrude from the first transmission housing 200 into the transmission housing cavity 206 and may be configured to capture lubricant 58, such as lubricant that may be splashed by the transmission 204 as the transmission 204 rotates in the transmission housing cavity 206. The scoop 282 may be disposed above the axis 70 and may be disposed above the center hole 210. The scoop 282 may be generally aligned with the enlarged end portion 270 of the second channel 236 and may be open in an upward-facing direction that may face away from the axis 70 so that the scoop 282 may capture or collect splashed lubricant 58 and cooperate with the first transmission housing 200 to direct or route the lubricant 58 into the second channel 236. Optionally, the scoop 282 may engage the deflector 238, may be fastened to the deflector 238, or both.

The deflector 238 may be disposed above the axis 70 and may extend from the first transmission housing 200 toward the second transmission housing 202. As such, the deflector 238 may extend into the transmission housing cavity 206.

The deflector 238 may direct lubricant 58 into the enlarged end portion 270 and/or the scoop 282. For instance, the deflector 238 may extend from a top interior side of the first transmission housing 200 in a downward direction toward the axis 70 and may be at least partially defined by opposing first and second surfaces 290, 292. The first and second surfaces 290, 292 may extend along an arc and may direct lubricant 58 into the enlarged end portion 270 and/or the scoop 282. The deflector 238 and its first and second surfaces 290, 292 may help disrupt or redirect lubricant 58 so that at least some lubricant 58 does not circulate in a loop along the interior surface 294 of the first transmission housing 200 when the transmission 204 rotates. For example, countershaft gears of the transmission 204 may rotate in a common rotational direction. This rotation may cause lubricant to circulate along the interior surface 294 of the first transmission housing 200 and reduce the amount of lubricant 58 that enters the inlet 550 of the second lubricant passage 34. The deflector 238 may disrupt lubricant circulation along the interior surface 294 so that more lubricant 58 may enter the second channel 236 and exit the transmission housing cavity 206 via that inlet 550 and the second lubricant passage 34, which may help reduce churning losses that may occur when excess lubricant 58 is in the transmission housing cavity 206 and may help improve operating efficiency of the axle assembly and may reduce energy consumption or power losses.

Figure 8:
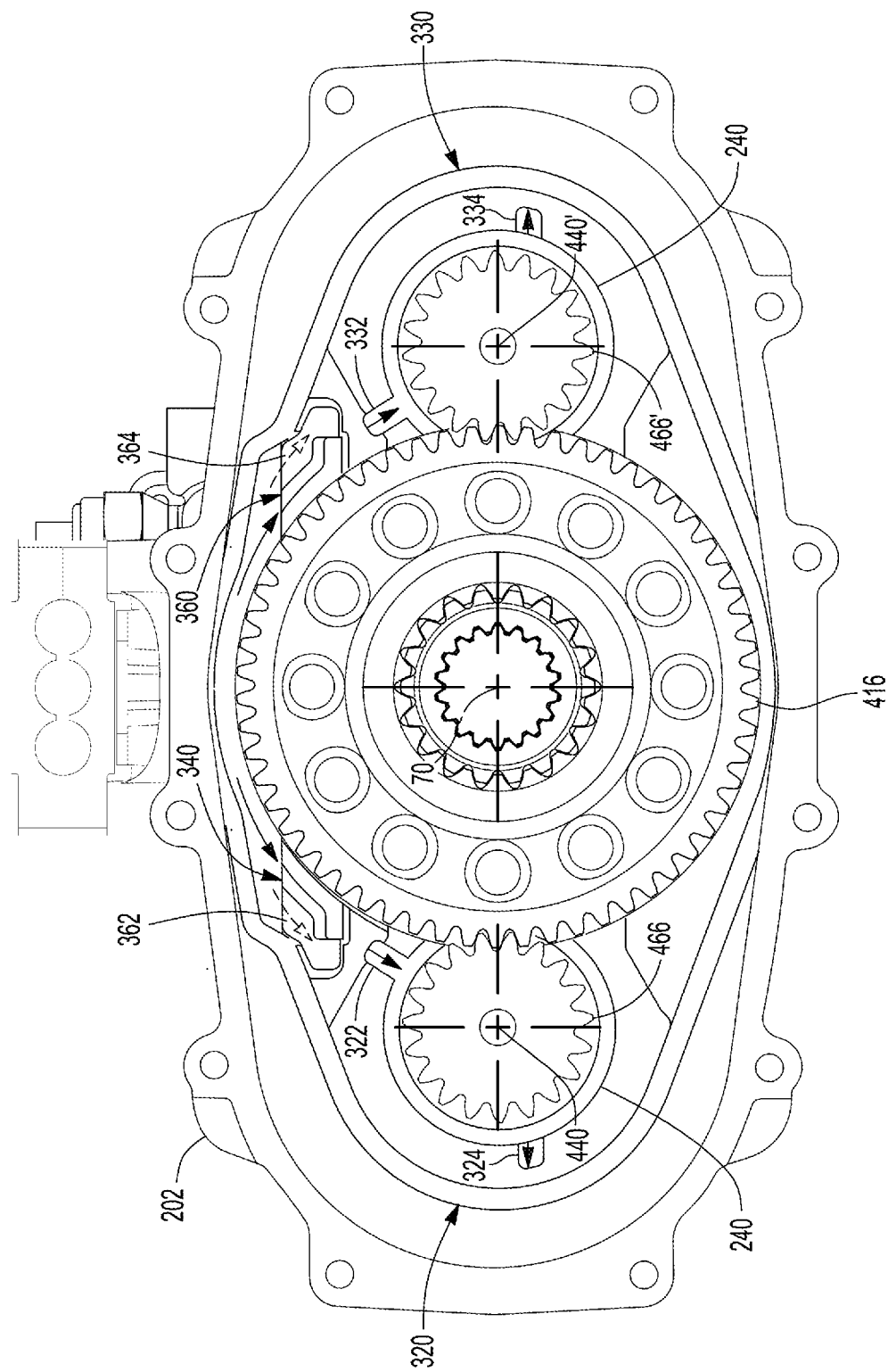
FIG. 8 is a side view of a portion of the axle assembly showing a second transmission case, a lubricant catcher mounted to the second transmission case, and a portion of a transmission of the axle assembly.
Figure 9:
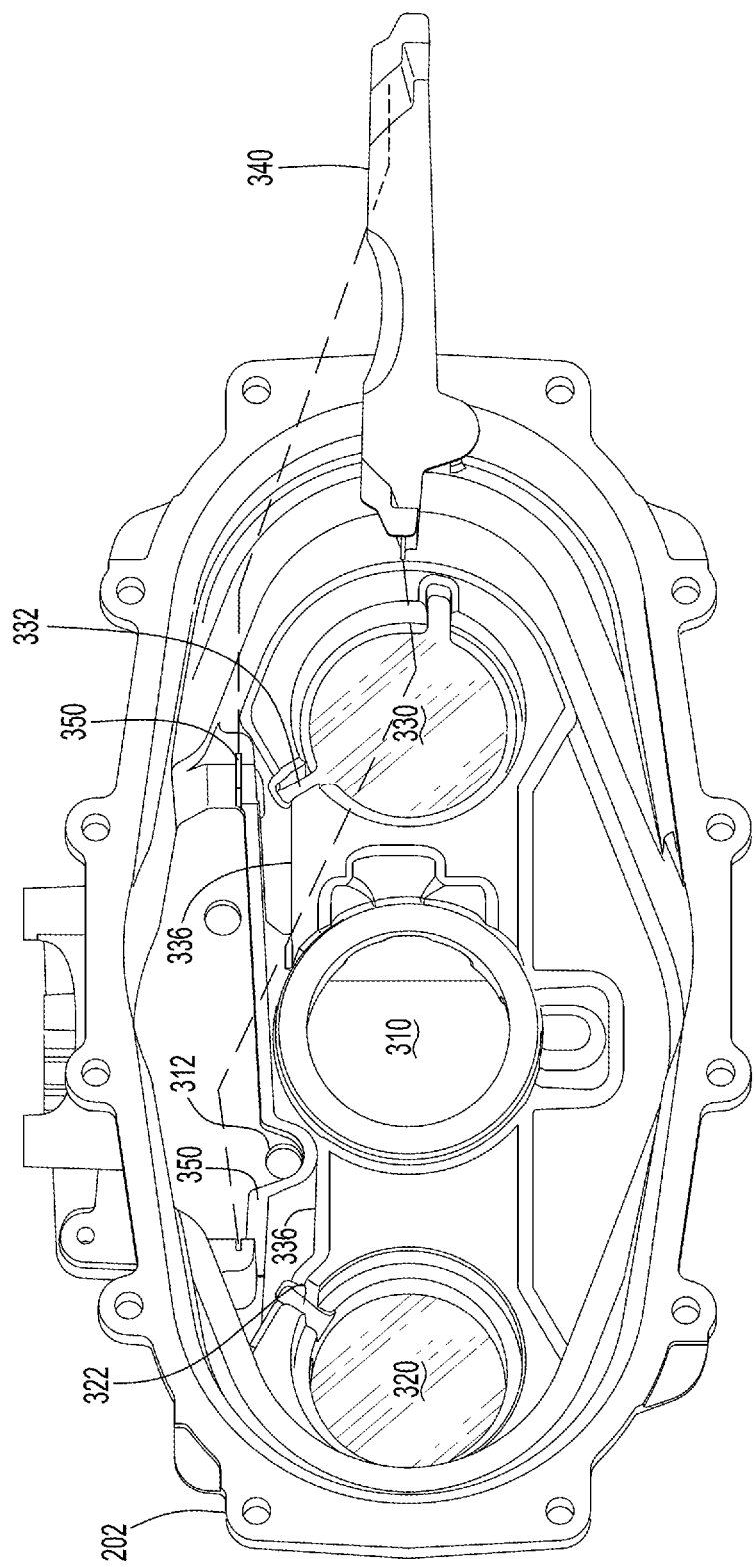
FIG. 9 is an exploded view of the second transmission case and the lubricant catcher.

Referring primarily to FIGS. 8-11, the second transmission housing 202 is shown. FIGS. 8 and 9 face along the axis 70 away from the first transmission housing 200 and the electric motor module 26 and thus are in the opposite direction along the axis 70 from the perspective shown in FIGS. 6 and 7. The second transmission housing 202 may be mounted to the first transmission housing 200. For instance, the first transmission housing 200 may be mounted to and may engage or contact a side of the first transmission housing 200 that may face away from the motor cover 110. As such, the first transmission housing 200 may separate the second transmission housing 202 from the motor cover 110. In at least one configuration and as is best shown in FIG. 9, the second transmission housing 202 may define a center hole 310 and a lubricant outlet hole 312. Referring to FIGS. 8 and 9, the second transmission housing 202 may also include first pocket 320, a first inlet slot 322, a first outlet slot 324, a second pocket 330, a second inlet slot 332, a second outlet slot 334, a ledge 336, or combinations thereof. A lubricant catcher 340 may be provided with the second transmission housing 202.

Figure 14:
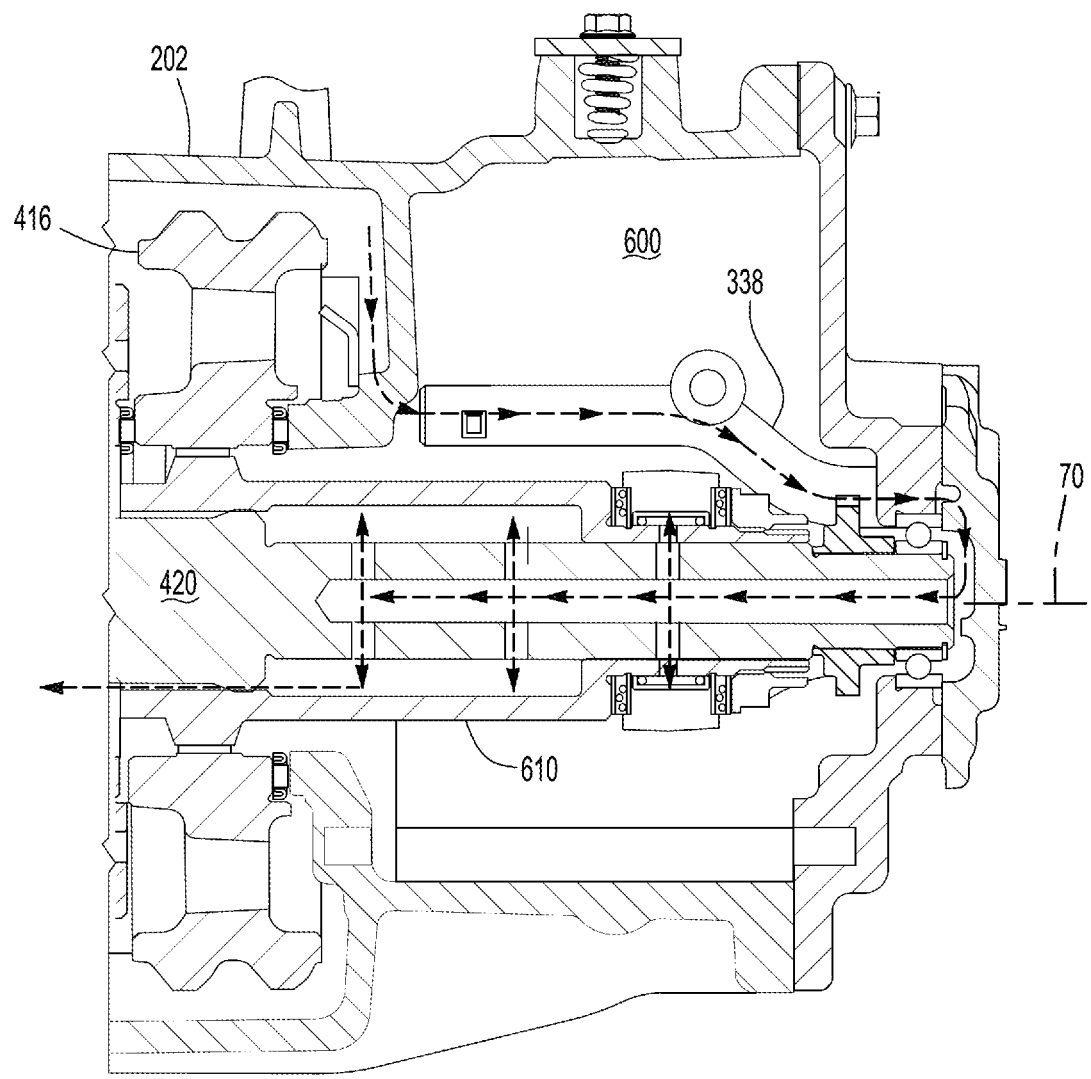
FIG. 14 is a magnified view of a portion of the axle assembly shown in FIG. 2.

Referring primarily to FIG. 9, the center hole 310 may be a through hole that may extend around the axis 70 or along the axis 70. In at least one configuration, the center hole 310 may receive the drive pinion 30 or an extension of the drive pinion 30 like the connecting member 420, which is best shown in FIG. 14.

The lubricant outlet hole 312 may be configured as a through hole that may extend through a wall of the second transmission housing 202. The lubricant outlet hole 312 may direct lubricant 58 that is captured by the lubricant catcher 340 into a shift mechanism housing cavity 600, which is best shown in FIG. 14. For instance, the lubricant outlet hole 312 may be fluidly connected to a pipe or tube 338 that may route lubricant 58 from the lubricant outlet hole 312 to a desired location in the shift mechanism housing cavity 600.

Referring to FIGS. 8 and 9, the first pocket 320 may be configured as a recess or indentation in the second transmission housing 202 that may extend away from the first transmission housing 200. As is best shown in FIG. 8, the first pocket 320 may receive a bearing assembly 240 that may rotatably support a first countershaft of the transmission 204. As is best shown in FIG. 9, the first pocket 320 may have a generally circular or cylindrical configuration and may be spaced apart from the center hole 310. The first pocket 320 or a portion thereof may be positioned below the lubricant outlet hole 312. In addition, the first pocket 320 may be aligned with and may be coaxially disposed with the first pocket 220 of the first transmission housing 200.

The first inlet slot 322 may route lubricant 58 to the first pocket 320 and the bearing assembly 240 that it receives. The first inlet slot 322 may be configured as a recess or indentation in the second transmission housing 202 that may extend away from the first transmission housing 200. The first inlet slot 322 that may extend from an outside circumference of the first pocket 320. In at least one configuration, the first inlet slot 322 may extend between the ledge 336 and the first pocket 320. The first inlet slot 322 may extend downward toward the first pocket 320 to facilitate the flow of lubricant 58 under the force of gravity from the ledge 336 to the first pocket 320. The first inlet slot 322 may be linear in one or more embodiments.

The first outlet slot 324 may allow lubricant 58 to exit the first pocket 320 and the bearing assembly 240 that it receives. The first outlet slot 324 may be configured as a recess or indentation in the second transmission housing 202. The first outlet slot 324 may extend from or protrude outwardly from an outside circumference of the first pocket 320. In at least one configuration, the first outlet slot 324 may extend from the first pocket 320 in a direction that may extend away from the center hole 310. The first outlet slot 324 may be spaced apart from the first inlet slot 322 and may be positioned closer to the bottom of the second transmission housing 202 than the first inlet slot 322 to facilitate the flow of lubricant 58 under the force of gravity from the first pocket 320 into the transmission housing cavity 206.

The second pocket 330 may be configured as a recess or indentation in the second transmission housing 202 that may extend away from the first transmission housing 200. The second pocket 330 may receive a bearing assembly 240 that may rotatably support a second countershaft of the transmission 204. The second pocket 330 may have a generally circular or cylindrical configuration and may be spaced apart from the center hole 310. The second pocket 330 or a portion thereof may be positioned below the lubricant outlet hole 312. In addition, the second pocket 330 may be aligned with and may be coaxially disposed with the second pocket 230 of the first transmission housing 200.

The second inlet slot 332 may route lubricant 58 to the second pocket 330 and the bearing assembly 240 that it receives. The second inlet slot 332 may be configured as a recess or indentation in the second transmission housing 202 that may extend away from the first transmission housing 200. The second inlet slot 332 that may extend from an outside circumference of the second pocket 330. In at least one configuration, the second inlet slot 332 may extend between the ledge 336 and the second pocket 330. The second inlet slot 332 may extend downward toward the second pocket 330 to facilitate the flow of lubricant 58 under the force of gravity from the ledge 336 to the second pocket 330. The second inlet slot 332 may be linear in one or more embodiments.

The second outlet slot 334 may allow lubricant 58 to exit the second pocket 330 and the bearing assembly 240 that it receives. The second outlet slot 334 may be configured as a recess or indentation in the second transmission housing 202. The second outlet slot 334 may extend from or protrude outwardly from an outside circumference of the second pocket 330. In at least one configuration, the second outlet slot 334 may extend from the second pocket 330 in a direction that may extend away from the center hole 310. The second outlet slot 334 may be spaced apart from the second inlet slot 332 and may be positioned closer to the bottom of the second transmission housing 202 than the second inlet slot 332 to facilitate the flow of lubricant 58 under the force of gravity from the second pocket 330 into the transmission housing cavity 206.

Referring to FIG. 9, the ledge 336 may extend away from the first transmission housing 200. In at least one configuration, the ledge 336 may include one or more generally horizontal surfaces that may extend from the center hole 310 or a ring that may extend around the center hole 310. The ledge 336 may be disposed underneath the lubricant catcher 340.

Referring to FIGS. 8-10, the lubricant catcher 340 may be configured to capture lubricant 58 that may be splashed by the transmission 204 as the transmission 204 rotates in the transmission housing cavity 206. The lubricant catcher 340 may extend from the second transmission housing 202 toward the first transmission housing 200 such that the lubricant catcher 340 is spaced apart from the first transmission housing 200. As such, the lubricant catcher 340 may protrude from the second transmission housing 202 into the transmission housing cavity 206. In at least one configuration, the lubricant catcher 340 may be disposed above the axis 70 and may be disposed above the center hole 310 of the second transmission housing 202.

Referring to FIGS. 8, 10 and 11, the lubricant catcher 340 may straddle or extend over at least one member of the set of drive pinion gears 400 of the transmission 204. For instance, the lubricant catcher 340 may straddle or extend over at least a portion of the fourth gear 416 of the set of drive pinion gears 400. The lubricant catcher 340 or a portion thereof may extend over a member of the first countershaft gear set 402 of the transmission 204, a member of the second countershaft gear set 404 of the transmission 204, or combinations thereof. In FIG. 8 the lubricant catcher 340 is shown extending over a fourth countershaft gear 466 of the first countershaft gear set 402 and a fourth countershaft gear 466' of the second countershaft gear set 404.

The lubricant catcher 340 may be open in an upward-facing direction that may face away from the axis 70 so that the lubricant catcher 340 may cooperate with the second transmission housing 202 to capture or collect lubricant 58 and direct or route the lubricant 58 into the lubricant outlet hole 312. The lubricant catcher 340 may be a separate component from the second transmission housing 202 that may be attached to the second transmission housing 202 in any suitable manner. For instance, the lubricant catcher 340 may be received in one or more slots 350, which are best shown in FIG. 9, that may be provided with the second transmission housing 202. Alternatively or in addition, the lubricant catcher 340 may be attached to the second transmission housing 202 with one or more fasteners. The fasteners may or may not be integrally formed with the lubricant catcher 340. In at least one configuration and as is best shown with reference to FIGS. 8 and 10, the lubricant catcher 340 may at least partially define a center trough 360, a first end trough 362, a second end trough 364, or combinations thereof.

The center trough 360 may extend laterally along the second transmission housing 202. In at least one configuration, the second transmission housing 202 and the lubricant catcher 340 may cooperate to define the center trough 360. Lubricant 58 that is captured by the lubricant catcher 340 may be routed to the lubricant outlet hole 312.

The first end trough 362 may extend from the center trough 360 toward the first transmission housing 200 to help capture more lubricant 58 than may be captured by the center trough 360. Lubricant 58 that is captured by the first end trough 362 may be routed to the center trough 360. The first end trough 362 may be spaced apart from the top of the second transmission housing 202 and may be disposed above one or more gears of the transmission 204. For instance, the first end trough 362 may be disposed above a member of the set of drive pinion gears 400, a member of the first countershaft gear set 402, or both. In at least one configuration, the second transmission housing 202 and the lubricant catcher 340 may cooperate to define the first end trough 362.

The second end trough 364 may be spaced apart from the first end trough 362. The second end trough 364 may extend from the center trough 360 toward the first transmission housing 200 to help capture more lubricant 58 than may be captured by the center trough 360. In at least one configuration, the second end trough 364 may be disposed at an opposite end of the center trough 360 from the first end trough 362. As such, member of the set of drive pinion gears 400 like the fourth gear 416 may be received between the first end trough 362 and the second end trough 364. Lubricant 58 that is captured by the second end trough 364 may be routed to the center trough 360. The second end trough 364 may be spaced apart from the top of the second transmission housing 202 and may be disposed above one or more gears of the transmission 204. For instance, the second end trough 364 may be disposed above a member of the set of drive pinion gears 400, a member of the second countershaft gear set 404, or both. In at least one configuration, the second transmission housing 202 and the lubricant catcher 340 may cooperate to define the second end trough 364.

Referring to FIGS. 10 and 11, the transmission 204 may be operatively connected to the electric motor. In at least one configuration, the transmission 204 may be configured as a countershaft transmission that may include a set of drive pinion gears 400, a first countershaft gear set 402, and a second countershaft gear set 404.

The set of drive pinion gears 400 may be received in the transmission housing cavity 206 and may be arranged along the axis 70 between the first transmission housing 200 and the second transmission housing 202. The set of drive pinion gears 400 may include a plurality of gears, some of which may be selectively coupled to the drive pinion 30. In the configuration shown, the set of drive pinion gears 400 includes a first gear 410, a second gear 412, a third gear 414, and a fourth gear 416; however, it is to be understood that a greater or lesser number of gears may be provided.

The first gear 410 may extend around the axis 70 and may be disposed proximate the first transmission housing 200. In at least one configuration, the first gear 410 may have a through hole that may receive the drive pinion 30, an extension of the drive pinion 30 like the connecting member 420, or both. The first gear 410 may have a plurality of teeth that may be arranged around and may extend away from the axis 70. The teeth of the first gear 410 may contact and may mate or mesh with teeth of a first countershaft gear that may be provided with the first countershaft gear set 402 and the second countershaft gear set 404 as will be discussed in more detail below. The first gear 410 may be operatively connected to the rotor 106 of the electric motor module 26 such that the rotor 106 and the first gear 410 are rotatable together about the axis 70. For example, the first gear 410 may be fixedly positioned with respect to the rotor 106 or fixedly coupled to the rotor 106 such that the first gear 410 is not rotatable about the axis 70 with respect to the rotor 106. It is contemplated that the first gear 410 may be fixedly mounted to or integrally formed with the rotor output flange 150. In addition, the first gear 410 may be continuously decoupled from the drive pinion 30 and may be rotatable with respect to the drive pinion 30. As such, a clutch may not connect the first gear 410 to the drive pinion 30 or the connecting member 420. The connecting member 420, if provided, may be received inside the first gear 410 and may be spaced apart from the first gear 410. In at least one configuration, the first gear 410 may be axially positioned along the axis 70 between the second gear 412 and the electric motor module 26.

The second gear 412 may extend around the axis 70. In at least one configuration, the second gear 412 may have a through hole that may receive the drive pinion 30, the connecting member 420, or both. The second gear 412 may have a plurality of teeth that may be arranged around and may extend away from the axis 70. The teeth of the second gear 412 may contact and may mate or mesh with teeth of a second countershaft gear that may be provided with the first countershaft gear set 402 and the second countershaft gear set 404 as will be discussed in more detail below. The second gear 412 may have a different diameter than the first gear 410. For example, the second gear 412 may have a larger diameter than the first gear 410. In at least one configuration, the second gear 412 may be axially positioned along the axis 70 between the first gear 410 and the third gear 414. The connecting member 420 may be received inside the second gear 412 and may be spaced apart from the second gear 412 in one or more configurations.

The third gear 414 may extend around the axis 70. In at least one configuration, the third gear 414 may have a through hole that may receive the drive pinion 30, the connecting member 420, or both. The third gear 414 may have a plurality of teeth that may be arranged around and may extend away from the axis 70. The teeth of the third gear 414 may contact and may mate or mesh with teeth of a third countershaft gear that may be provided with the first countershaft gear set 402 and the second countershaft gear set 404 as will be discussed in more detail below. The third gear 414 may have a different diameter than the first gear 410 and the second gear 412. For example, the third gear 414 may have a larger diameter than the first gear 410 and the second gear 412. In at least one configuration, the third gear 414 be axially positioned along the axis 70 between the second gear 412 and the fourth gear 416. The connecting member 420 may be received inside the third gear 414 and may be spaced apart from the third gear 414 in one or more configurations.

The fourth gear 416 may extend around the axis 70. In at least one configuration, the fourth gear 416 may have a through hole that may receive the drive pinion 30, a connecting member 420, or both. The fourth gear 416 may have a plurality of teeth that may be arranged around and may extend away from the axis 70. The teeth of the fourth gear 416 may contact and may mate or mesh with teeth of a fourth countershaft gear that may be provided with the first countershaft gear set 402 and the second countershaft gear set 404 as will be discussed in more detail below. The fourth gear 416 may have a different diameter than the first gear 410, the second gear 412, and the third gear 414, such as a larger diameter. In at least one configuration, the fourth gear 416 be axially positioned along the axis 70 further from the electric motor module 26 than the first gear 410, the second gear 412, and the third gear 414. As such, the fourth gear 416 may be axially positioned proximate or adjacent to the second transmission housing 202. The connecting member 420 may be received inside the fourth gear 416 and may be spaced apart from the fourth gear 416 in one or more configurations.

Optionally, thrust bearings 430 may be provided between members of the set of drive pinion gears 400, between the first transmission housing 200 and the set of drive pinion gears 400, between the second transmission housing 202 and the set of drive pinion gears 400, or combinations thereof. For instance, a first thrust bearing 430 may be axially positioned between the first transmission housing 200 and the first gear 410, a second thrust bearing 430 may be axially positioned between the first gear 410 and the second gear 412, a third thrust bearing 430 may be axially positioned between the second gear 412 and the third gear 414, a fourth thrust bearing 430 may be axially positioned between the third gear 414 and the fourth gear 416, and a fifth thrust bearing 430 may be axially positioned between the fourth gear 416 and the second transmission housing 202.

The first countershaft gear set 402 may be received in the transmission housing cavity 206 and may be in meshing engagement with the set of drive pinion gears 400. The first countershaft gear set 402 may be rotatable about a first countershaft axis 440. The first countershaft axis 440 may be disposed parallel or substantially parallel to the axis 70 in one or more embodiments. The first countershaft gear set 402 may include a first countershaft 450 and a plurality of gears. In the configuration shown, the plurality of gears of the first countershaft gear set 402 include a first countershaft gear 460, a second countershaft gear 462, a third countershaft gear 464, and a fourth countershaft gear 466; however, it is contemplated that a greater number of countershaft gears or a lesser number of countershaft gears may be provided.

The first countershaft 450 may be rotatable about the first countershaft axis 440. For instance, the first countershaft 450 may be rotatably supported on the first transmission housing 200 and the second transmission housing 202 by corresponding bearing assemblies 240. For example, first and second bearing assemblies 240 may be located near opposing first and second ends the first countershaft 450, respectively. The first countershaft 450 may support and be rotatable with the first countershaft gear 460, the second countershaft gear 462, the third countershaft gear 464, and the fourth countershaft gear 466.

The first countershaft gear 460 may be fixedly disposed on the first countershaft 450 or fixedly mounted to the first countershaft 450. As such, the first countershaft gear 460 may rotate about the first countershaft axis 440 with the first countershaft 450 and may not be rotatable with respect to the first countershaft 450. For example, the first countershaft gear 460 may have a hole that may receive the first countershaft 450 and may be fixedly coupled to the first countershaft 450. The first countershaft gear 460 may extend around the first countershaft axis 440 and may have a plurality of teeth that may be arranged around and may extend away from the first countershaft axis 440. The teeth of the first countershaft gear 460 may contact and may mate or mesh with the teeth of the first gear 410. In at least one configuration, the first countershaft gear 460 may be axially positioned along the first countershaft axis 440 between the second countershaft gear 462 of the first countershaft gear set 402 and the first transmission housing 200.

The second countershaft gear 462 may be fixedly disposed on the first countershaft 450 or fixedly mounted to the first countershaft 450. As such, the second countershaft gear 462 may rotate about the first countershaft axis 440 with the first countershaft 450 and may not be rotatable with respect to the first countershaft 450. For example, the second countershaft gear 462 may have a hole that may receive the first countershaft 450 and may be fixedly coupled to the first countershaft 450. The second countershaft gear 462 may extend around the first countershaft axis 440 and may have a plurality of teeth that may be arranged around and may extend away from the first countershaft axis 440. The teeth of the second countershaft gear 462 may contact and may mate or mesh with the teeth of the second gear 412. The second countershaft gear 462 may have a different diameter than the second countershaft gear 462 and the third countershaft gear 464. In at least one configuration, the second countershaft gear 462 may be axially positioned along the first countershaft axis 440 between the first countershaft gear 460 of the first countershaft gear set 402 and the third countershaft gear 464 of the first countershaft gear set 402.

The third countershaft gear 464 may be fixedly disposed on the first countershaft 450 or fixedly mounted to the first countershaft 450. As such, the third countershaft gear 464 may rotate about the first countershaft axis 440 with the first countershaft 450 and may not be rotatable with respect to the first countershaft 450. For example, the third countershaft gear 464 may have a hole that may receive the first countershaft 450 and may be fixedly coupled to the first countershaft 450. The third countershaft gear 464 may extend around the first countershaft axis 440 and may have a plurality of teeth that may be arranged around and may extend away from the first countershaft axis 440. The teeth of the third countershaft gear 464 may contact and may mate or mesh with the teeth of the third gear 414. The third countershaft gear 464 may have a different diameter than the first countershaft gear 460 and the second countershaft gear 462. In at least one configuration, the third countershaft gear 464 may be axially positioned along the first countershaft axis 440 between the second countershaft gear 462 of the first countershaft gear set 402 and the fourth countershaft gear 466 of the first countershaft gear set 402.

The fourth countershaft gear 466 may be fixedly disposed on the first countershaft 450 or fixedly mounted to the first countershaft 450. As such, the fourth countershaft gear 466 may rotate about the first countershaft axis 440 with the first countershaft 450 and may not be rotatable with respect to the first countershaft 450. For example, the fourth countershaft gear 466 may have a hole that may receive the first countershaft 450 and may be fixedly coupled to the first countershaft 450 or may be integrally formed with the first countershaft 450. The fourth countershaft gear 466 may extend around the first countershaft axis 440 and may have a plurality of teeth that may be arranged around and may extend away from the first countershaft axis 440. The teeth of the fourth countershaft gear 466 may contact and may mate or mesh with the teeth of the fourth gear 416. The fourth countershaft gear 466 may have a different diameter than the first countershaft gear 460, the second countershaft gear 462, and the third countershaft gear 464. In at least one configuration, the fourth countershaft gear 466 may be axially positioned along the first countershaft axis 440 further from the electric motor module 26 than the third countershaft gear 464 of the first countershaft gear set 402.

The second countershaft gear set 404 may be received in the transmission housing cavity 206 and may be rotatable about a second countershaft axis 440'. The second countershaft axis 440' may be disposed parallel or substantially parallel to the axis 70 and the first countershaft axis 440 in one or more embodiments. The second countershaft gear set 404 may generally be disposed on an opposite side of the axis 70 from the first countershaft gear set 402 or may be disposed such that the first countershaft axis 440 and the second countershaft axis 440' may be disposed at a common radial distance from the axis 70.

The second countershaft gear set 404 may have the same or substantially the same configuration as the first countershaft gear set 402. For example, the second countershaft gear set 404 may include a second countershaft 450' that may be analogous to or may have the same structure as the first countershaft 450. In addition, the second countershaft gear set 404 may include a plurality of gears that are rotatable with the second countershaft 450'. In the configuration shown, the plurality of gears of the second countershaft gear set 404 include a first countershaft gear 460', a second countershaft gear 462', a third countershaft gear 464', and a fourth countershaft gear 466'; however, it is contemplated that a greater number of gears or a lesser number of gears may be provided. The first countershaft gear 460', second countershaft gear 462', third countershaft gear 464', and the fourth countershaft gear 466' of the second countershaft gear set 404 may be analogous to or may have the same structure as the first countershaft gear 460, second countershaft gear 462, third countershaft gear 464, and the fourth countershaft gear 466, respectively, of the first countershaft gear set 402. The first countershaft gear 460', second countershaft gear 462', third countershaft gear 464', and the fourth countershaft gear 466' may be arranged along and may be rotatable about a second countershaft axis 440' rather than the first countershaft axis 440 and may be fixed to the second countershaft 450' rather than the first countershaft 450.

The first gear 410 and the first countershaft gears 460, 460' may provide a different gear ratio than the second gear 412 and the second countershaft gears 462, 462', the third gear 414 and the third countershaft gears 464, 464', and the fourth gear 416 and the fourth countershaft gears 466, 466'. Gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 400, the gears of the first countershaft gear set 402, and the gears of the second countershaft gear set 404 may have a helical configuration.

First and Second Lubricant Passages

Referring to FIG. 12, a side view of a portion of the axle assembly 10 is shown with an example of the first lubricant passage 32 shown with hidden lines. The first lubricant passage 32 may route lubricant 58 from the housing assembly 20 to the transmission housing cavity 206 to lubricate components that are disposed outside of the housing assembly 20.

The first lubricant passage 32 may be at least partially defined by through holes in the differential carrier 42, the motor housing 100, the motor cover 110, and the first transmission housing 200 that may be fluidly connected to each other. As such, the first lubricant passage 32 may extend through the motor housing 100, the motor cover 110, and the first transmission housing 200. The first lubricant passage 32 may be at least partially defined in the exterior walls of the motor housing 100, the motor cover 110, and the first transmission housing 200. Such a configuration may allow lubricant 58 to be routed away from the axis 70 and around the stator 104 and rotor 106 to transport lubricant 58 from the housing assembly 20 to the transmission housing cavity 206 rather than routing lubricant 58 through the motor housing cavity 120 of the motor housing 100, through the motor cover opening 164 of the motor cover 110, or both. In at least one configuration, the first lubricant passage 32 may be completely disposed above the axis 70. The first lubricant passage 32 may have at least one inlet 500 and at least one outlet 502.

The inlet 500 may be disposed proximate the housing assembly 20. The inlet 500 may receive lubricant 58 that is splashed by the differential assembly 22, such as when the differential assembly 22 rotates about the differential axis 80 as previously discussed. In at least one configuration, the inlet 500 may be provided with the differential carrier 42. The inlet 500 may be positioned above the outlet 502 or disposed further above the axis 70 than the outlet 502. As such, the first lubricant passage 32 or a portion thereof may slope downward from the inlet 500 toward or to the outlet 502.

The outlet 502 may be provided with the first transmission housing 200 as previously discussed.

Referring to FIGS. 4 and 5, portions of the first lubricant passage 32 that are defined by the motor housing 100, motor cover 110, and the first transmission housing 200 are shown. In these figures, lubricant flow is represented by the dashed arrowed lines.

The portion 510 of the first lubricant passage 32 that is defined by the motor housing 100 may be disposed between and may be spaced apart from the exterior side 122 and the interior side 124 of the motor housing 100. As such, the portion 510 may be radially positioned further from the axis 70 than the stator 104, the coolant jacket 102, and the interior side 124. The portion 510 may extend between an inlet port 512 and an outlet port 514. The inlet port 512 may face toward the differential carrier 42 and may be fluidly connected to the inlet 500. The outlet port 514 may be disposed opposite the inlet port 512 and may be disposed adjacent to the motor cover 110.

The portion 520 of the first lubricant passage 32 that is defined by the motor cover 110 may be disposed between and may be spaced apart from the exterior side and the interior side of the motor cover 110. As such, the portion 520 may be radially positioned further from the axis 70 than the motor cover opening 164. The portion 520 may extend between an inlet port 522 and an outlet port 524. The inlet port 522 may face toward the motor housing 100 and may be fluidly connected to the outlet port 514. The outlet port 524 may be disposed opposite the inlet port 522 and may be disposed adjacent to the first transmission housing 200.

The portion 530 of the first lubricant passage 32 that is defined by the first transmission housing 200 may extend between and inlet port 532 and the outlet 502. The inlet port 532 may face toward the motor cover 110 and may be fluidly connected to the of the outlet port 524. The outlet 502 may be disposed opposite the inlet port 532.

Referring to FIG. 13, a side view of a portion of the axle assembly 10 is shown with an example of the second lubricant passage 34 shown with hidden lines. The second lubricant passage 34 may return lubricant to the sump portion 56 of the housing assembly 20. For instance, the second lubricant passage 34 may route lubricant 58 from the transmission housing cavity 206 to the housing assembly 20 and may allow a common type of lubricant 58 or a common sump portion 56 to be provided with the axle assembly 10. The second lubricant passage 34 may be spaced apart from the first lubricant passage 32. In the configuration shown, the second lubricant passage 34 is disposed on an opposite side of the axle assembly 10 from the first lubricant passage 32.

The second lubricant passage 34 may be at least partially defined by through holes in the first transmission housing 200, the motor cover 110, the motor housing 100, and the differential carrier 42 that may be fluidly connected to each other. As such, the second lubricant passage 34 may extend through the first transmission housing 200, the motor cover 110, and the motor housing 100. The second lubricant passage 34 may be at least partially defined in the exterior walls of the first transmission housing 200, the motor cover 110, and the motor housing 100. Such a configuration may allow lubricant 58 to be routed away from the axis 70 and around the stator 104 and rotor 106 to transport lubricant 58 from the transmission housing cavity 206 to the housing assembly 20 rather than routing lubricant 58 through the motor housing cavity 120 of the motor housing 100, through the motor cover opening 164 of the motor cover 110, or both. In at least one configuration, the second lubricant passage 34 may be at least partially disposed below the first lubricant passage 32. For instance, the second lubricant passage 34 or a portion thereof may be disposed below the axis 70. The second lubricant passage 34 may have at least one inlet 550 and at least one outlet 552.

The inlet 550 may be defined by the first transmission housing 200. The inlet 500 may receive lubricant 58 that is splashed by the transmission 204, such as when the transmission 204 rotates as previously discussed. The inlet 550 may be disposed above the outlet 552. As such, the second lubricant passage 34 or a portion thereof may slope downward from the inlet 550 toward or to the outlet 552.

The outlet 552 may be provided with the differential carrier 42.

Referring to FIGS. 4 and 5, portions of the second lubricant passage 34 that are defined by the first transmission housing 200, motor cover 110, and the motor housing 100 are shown.

The portion 560 of the second lubricant passage 34 that is defined by the first transmission housing 200 may extend between and inlet 550 and an outlet port 574. The inlet 550 may face toward and may be fluidly connected to the transmission housing cavity 206. The outlet port 574 may be disposed opposite the inlet 550.

The portion 580 of the second lubricant passage 34 that is defined by the motor cover 110 may be disposed between and may be spaced apart from the exterior side and the interior side of the motor cover 110. As such, the portion 580 may be radially positioned further from the axis 70 than the motor cover opening 164. The portion 580 may extend between an inlet port 582 and an outlet port 584. The inlet port 582 may face toward the first transmission housing 200 and may be fluidly connected to the of the outlet port 574. The outlet port 584 may be disposed opposite the inlet port 582 and may be disposed adjacent to the motor housing 100.

The portion 590 of the second lubricant passage 34 that is defined by the motor housing 100 may be disposed between and may be spaced apart from the exterior side 122 and the interior side 124 of the motor housing 100. As such, the portion 590 may be radially positioned further from the axis 70 than the stator 104, the coolant jacket 102, and the interior side 124. The portion 590 may extend between an inlet port 592 and an outlet port 594. The inlet port 592 may face toward the motor cover 110 and may be fluidly connected to the outlet port 584. The outlet port 594 may be disposed opposite the inlet port 512 and may be disposed adjacent to the differential carrier 42 and may be fluidly connected to the outlet 552 of the second lubricant passage 34.

Shift Mechanism

Figure 3:
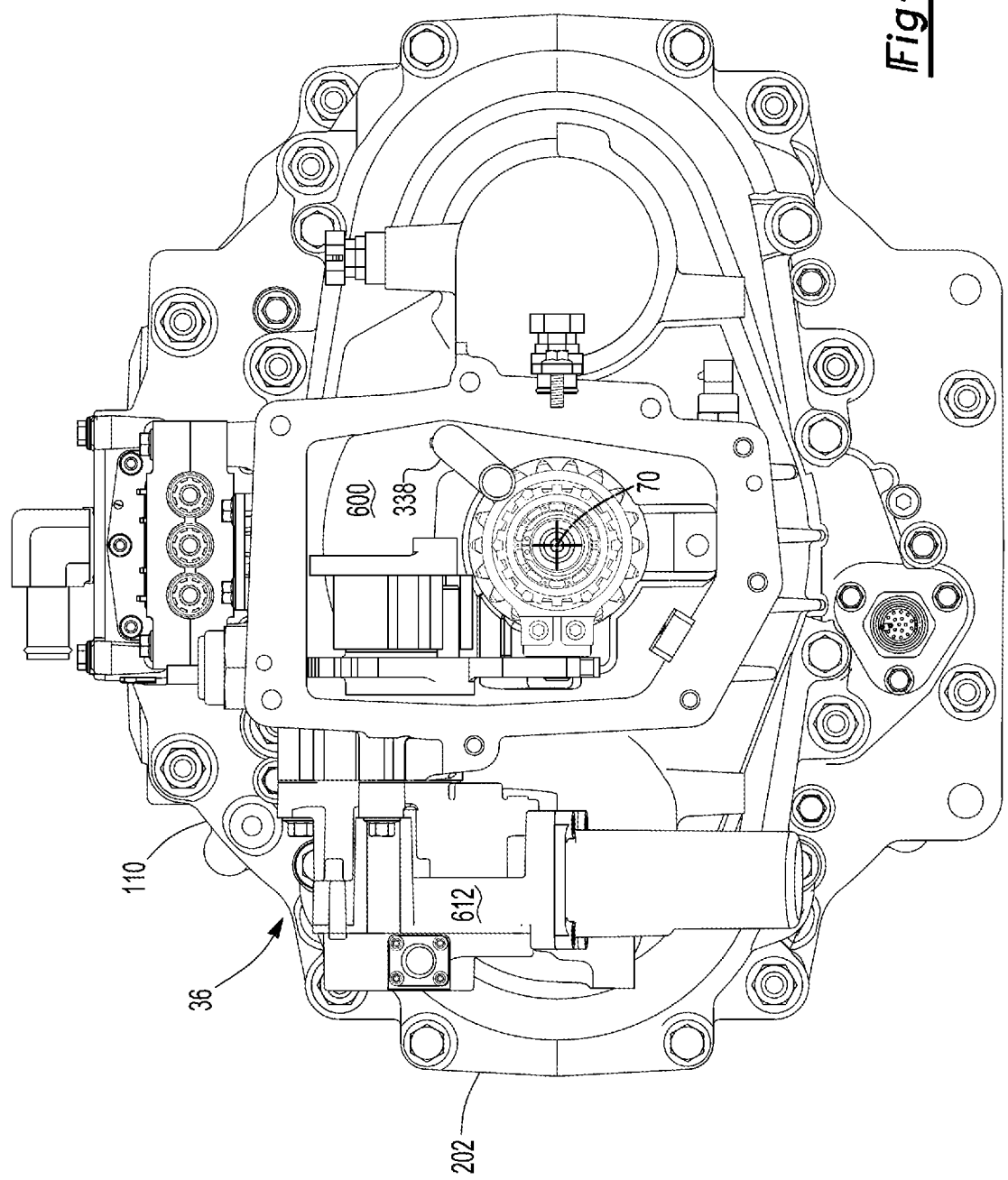
FIG. 3 is an end view of the axle assembly with covers at the end of the axle assembly removed.

Referring to FIGS. 3 and 13, the shift mechanism 36 may cooperate with the transmission module 28 to provide a desired gear reduction ratio to change the torque provided from the electric motor module 26 to the differential assembly 22, and hence to the axle shafts 24 of the axle assembly 10. In at least one configuration, the shift mechanism 36 may operatively connect a member of the set of drive pinion gears 400 to the drive pinion 30 such that the connected drive pinion gear is rotatable with the drive pinion 30. More specifically, the shift mechanism 36 may couple one member of the set of drive pinion gears 400 at a time to the drive pinion 30 to provide different drive gear ratios.

The shift mechanism 36 may be received in or partially received in a shift mechanism housing cavity 600, which is best shown in FIGS. 3 and 14. The shift mechanism housing cavity 600 may be partially defined by the second transmission housing 202 and may be disposed proximate an end of the axle assembly 10.

The shift mechanism 36 may have any suitable configuration. For instance, the shift mechanism 36 may include one of more clutches of any suitable type. In the configuration shown, the shift mechanism 36 includes a shift collar 610 that may be moveable along the axis 70 to selectively connect a member of the set of drive pinion gears 400 to the drive pinion 30 so that a connected gear may rotate about the axis 70 with the drive pinion 30.

An actuator 612 may actuate the shift mechanism 36. The actuator 612 may be of any suitable type, such as an electric, electromechanical, or mechanical actuator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a housing assembly that receives a differential assembly and that at least partially defines a cavity that has a sump portion that receives lubricant;
    an electric motor module that includes:
        a motor housing that is mounted to the housing assembly and defines a motor housing cavity that receives an electric motor; and
        a motor cover that is mounted to an end of the motor housing opposite the housing assembly;
    a transmission module that includes:
        a first transmission housing that is mounted to the motor cover; and
        a second transmission housing that is mounted to the first transmission housing, wherein the first and second transmission housings cooperate to define a transmission housing cavity that receives a transmission that is operatively connected to the electric motor; and
    a first lubricant passage that routes lubricant from the housing assembly to the transmission housing cavity, wherein the first lubricant passage extends through the motor housing, the motor cover, and the first transmission housing, and is separated from the motor housing cavity.

2. The axle assembly of claim 1 wherein the first transmission housing defines a first pocket that receives a bearing assembly that rotatably supports a first countershaft, and a first connection passage that extends from an outlet of the first lubricant passage to the first pocket.

3. The axle assembly of claim 1 wherein the first transmission housing defines a first pocket that receives a bearing assembly that rotatably supports a first countershaft, a first channel that is spaced apart from the first pocket and extends from an outlet of the first lubricant passage, and a first baffle that extends over the outlet and that deflects lubricant that exits the outlet into the first channel.

4. The axle assembly of claim 3 wherein the first channel extends from the outlet to a first channel end that is disposed below a center hole of the first transmission housing that receives a drive pinion, wherein the first baffle does not cover the first channel end so as to allow lubricant to exit the first channel at the first channel end.

5. The axle assembly of claim 3 wherein the first baffle is received inside the first channel.

6. The axle assembly of claim 1 further comprising a second lubricant passage that routes lubricant from the transmission housing cavity to the housing assembly, wherein the second lubricant passage extends through the first transmission housing, the motor cover, and the motor housing, and is separated from the first lubricant passage and the motor housing cavity.

7. The axle assembly of claim 6 wherein the first transmission housing defines a second channel that extends from an inlet of the second lubricant passage, a second pocket that receives a bearing assembly that rotatably supports a second countershaft, and a second connection passage that extends from the second channel to the second pocket.

8. The axle assembly of claim 6 wherein the first transmission housing defines a second pocket that receives a bearing assembly that rotatably supports a second countershaft, a second channel that is spaced apart from the second pocket and extends from an inlet of the second lubricant passage, and a second baffle that extends over a portion of the second channel and that deflects lubricant into the inlet of the second lubricant passage.

9. The axle assembly of claim 8 wherein the first transmission housing defines a center hole that extends along an axis and that receives a drive pinion, and wherein the second baffle has a scoop that is disposed above the axis, the scoop being configured to capture lubricant that is splashed by the transmission in the transmission housing cavity and route lubricant to the second channel.

10. The axle assembly of claim 9 further comprising a deflector that is disposed above the axis and that extends from the first transmission housing into the transmission housing cavity and toward the second transmission housing, wherein the deflector directs lubricant into the scoop.

11. The axle assembly of claim 10 wherein the second baffle is mounted to the deflector.

12. An axle assembly comprising:
    a housing assembly that receives a differential assembly and that at least partially defines a cavity that has a sump portion that receives lubricant;
    an electric motor module that is mounted to the housing assembly;
    a transmission module that includes:
        a first transmission housing that is mounted to the electric motor module and is fluidly connected to the housing assembly via a first lubricant passage; and
        a second transmission housing that is mounted to the first transmission housing, wherein the first and second transmission housings cooperate to define a transmission housing cavity that receives a transmission, and a lubricant catcher is received in the transmission housing cavity, the lubricant catcher being mounted to the second transmission housing and extending from the second transmission housing toward the first transmission housing.

13. The axle assembly of claim 12 wherein the second transmission housing defines a center hole that extends along an axis, the transmission includes a set of drive pinion gears that are arranged along the axis between the first transmission housing and the second transmission housing, and wherein at least a portion of the lubricant catcher extends over at least one member of the set of drive pinion gears.

14. The axle assembly of claim 13 wherein the lubricant catcher at least partially defines a center trough that extends along the second transmission housing and a first end trough that extends from the center trough toward the first transmission housing, the first end trough being disposed above a member of the set of drive pinion gears.

15. The axle assembly of claim 14 wherein the lubricant catcher at least partially defines a second end trough that extends from the center trough toward the first transmission housing and that is spaced apart from the first end trough, wherein the member of the set of drive pinion gears is received between the first end trough and the second end trough.

16. The axle assembly of claim 15 wherein the second transmission housing and the lubricant catcher cooperate to define at least one of the center trough, the first end trough, and the second end trough and the lubricant catcher is spaced apart from the first transmission housing.

17. The axle assembly of claim 15 wherein the transmission includes a first countershaft gear set that is rotatable about a first countershaft axis, and a second countershaft gear set that is rotatable about a second countershaft axis, and wherein the lubricant catcher extends over a member of the first countershaft gear set and a member of the second countershaft gear set.

18. The axle assembly of claim 12 wherein the second transmission housing defines a first pocket that receives a bearing assembly that rotatably supports a first countershaft, a first inlet slot that protrudes from an outside circumference of the first pocket, and a first outlet slot that is spaced apart from the first inlet slot and protrudes outwardly from the outside circumference of the first pocket, wherein the first inlet slot facilitates lubricant flow to the first pocket and the first outlet slot facilitates lubricant flow from the first pocket.

19. The axle assembly of claim 18 wherein the second transmission housing defines a ledge that is disposed underneath the lubricant catcher, wherein the first inlet slot extends from the ledge.

20. The axle assembly of claim 12 wherein the second transmission housing has a lubricant outlet hole that is a through hole that extends through the second transmission housing, and wherein lubricant that is captured by the lubricant catcher is routed to the lubricant outlet hole.

* * * * *